United States Patent [19]

Baker et al.

[11] Patent Number: 4,746,854
[45] Date of Patent: May 24, 1988

[54] BATTERY CHARGING SYSTEM WITH MICROPROCESSOR CONTROL OF VOLTAGE AND CURRENT MONITORING AND CONTROL OPERATIONS

[75] Inventors: William Baker, Indianapolis; James C. Stevens, Plainfield; Phong B. Chau, Indianapolis, all of Ind.

[73] Assignee: Span, Inc., Indianapolis, Ind.

[21] Appl. No.: 925,832

[22] Filed: Oct. 29, 1986

[51] Int. Cl.⁴ .................................... H02J 7/04
[52] U.S. Cl. .......................... 320/40; 320/20; 320/21; 320/22; 320/37
[58] Field of Search ............ 320/20, 21, 22, 37, 320/40

[56] References Cited

U.S. PATENT DOCUMENTS

| | | | |
|---|---|---|---|
| 3,786,343 | 1/1974 | Ehlers . | |
| 3,794,905 | 2/1974 | Long | 320/20 |
| 3,890,556 | 6/1975 | Melling et al. | 320/21 |
| 3,936,718 | 2/1976 | Melling et al. | 320/20 |
| 3,938,021 | 2/1976 | Kosmin | 320/40 |
| 3,940,679 | 2/1976 | Brandwein et al. | 320/48 |
| 4,118,661 | 10/1978 | Siekierski et al. | 320/40 |
| 4,191,918 | 3/1980 | Nicholls | 320/20 |
| 4,238,721 | 12/1980 | DeLuca et al. | 320/22 |
| 4,354,148 | 10/1982 | Tada et al. | 320/20 |
| 4,385,269 | 5/1983 | Aspinwall et al. | 320/20 |
| 4,388,582 | 6/1983 | Saar et al. | 320/20 |
| 4,392,101 | 7/1983 | Saar et al. | 320/20 |
| 4,418,310 | 11/1983 | Bollinger | 320/37 |
| 4,455,523 | 6/1984 | Koenck | 320/39 |
| 4,549,127 | 10/1985 | Taylor et al. | 320/21 |
| 4,553,081 | 11/1985 | Koenck | 320/39 |
| 4,575,669 | 3/1986 | Brown | 320/39 |
| 4,583,035 | 4/1986 | Sloan | 320/22 |

OTHER PUBLICATIONS

General Electric Company "Nickel-Cadmium Battery Application Handbook" Third Edition-1986, Table of Contents and pp. 2-1, 2-11, 3-1 to 3-62; and 4-2 to 4-30.

Primary Examiner—Patrick R. Salce
Assistant Examiner—Anita M. Ault
Attorney, Agent, or Firm—Neuman, Williams, Anderson & Olson

[57] ABSTRACT

A battery charger system is provided in which a microprocessor is used to discontinue application of a high charge current when the battery voltage drops below a peak value by a value greater than a threshold value corresponding to stored digital data. The microprocessor is also used to obtain a discharge mode of operation and an autocycle mode of operation in which a charge operation is performed after a discharge operation, the microprocessor being responsive to actuation of keys of a keyboard. In performing various operations, the microprocessor is used in performing analog-to-digital conversions and it is additionally used in computing energy capacity and efficiency.

16 Claims, 15 Drawing Sheets

BATTERY CHARGING SYSTEM WITH MICROPROCESSOR CONTROL OF VOLTAGE AND CURRENT MONITORING AND CONTROL OPERATIONS

This invention relates to a battery system and more particularly to a battery charging system which achieves very rapid optimum charging of batteries to full charge conditions, while avoiding overcharging and otherwise insuring safe and reliable operation. The system is easy to operate and control and is highly versatile with various modes of operation including discharge and autocycle modes, it provides accurate measurements of battery performance and condition and it is readily and economically manufacturable.

BACKGROUND OF THE INVENTION

Many arrangements have been previously used or proposed for the charging of various types of batteries including nickel-cadmium (NIcad) batteries which are quite capable of being charged at a rapid rate but which are easily damaged or destroyed if a high charge current is continued after a full charge condition has been reached. Chargers are commercially available which include mechanical timers set by the users to terminate charging after a set elapsed time. If set too long, dangerous overcharging may result. If set too short, the battery will not be fully charged. Other prior art arrangements have circuits designed for automatic control of termination of charge. For example, the Kosmin U.S. Pat. No. 3,938,021 discloses an analog circuit in which a series connected diode and capacitor are connected to a resistive voltage divider which is connected across terminals of a constant charge current source, an amplifier being provided having a high impedance input connected across the diode and having an output for controlling a transistor amplifier to turn off charge current when the charge voltage drops to a value such that there is no voltage across the diode. This type of circuit may operate satisfactorily but is not completely reliable and may allow charging beyond the full charge condition so that damage to batteries may result, in the absence of operator intervention.

A number of other prior patents contain proposals for use of digital or microprocessor circuits in charging or monitoring of the charge of NIcad or other types of batteries. These patents include the Ehlers U.S. Pat. No. 3,786,343, the Long U.S. Pat. No. 3,794,905, the Melling et al U.S. Pat. No. 3,890,556, the Melling et al U.S. Pat. No. 3,936,718, the Brandwein et al U.S. Pat. No. 3,940,679, the Siekierski et al U.S. Pat. No. 4,118,661, the Nicholls U.S. Pat. No. 4,191,918, the DeLuca et al U.S. Pat. No. 4,238,721, the Aspinwall et al U.S. Pat. No. 4,385,269, the Saar et al U.S. Pat. No. 4,388,582, the Saar et al U.S. Pat. No. 4,392,101, the Bollinger U.S. Pat. No. 4,418,310, the Koenck U.S. Pat. No. 4,455,523 and the Taylor U.S. Pat. No. 4,549,127. In general, such proposals involve the use of circuits which are complex and expensive and would not produce optimum results in charging of NIcad batteries.

An important consideration relates to the criteria used for determining when a charging operation should be terminated. The criteria which are disclosed in the aforementioned patents include the peak voltage condition, an inflection point of the voltage curve prior to the peak voltage condition, responses of a battery at certain times after application of a charging pulse and values or changes of temperature or other conditions. Peak voltage is used in the system of the Kosmin patent, a voltage proportional to peak voltage being stored by a capacitor for use in determining when the battery voltage has reached a peak and then dropped therebelow.

An attempt to use peak voltage as a criterion is also disclosed in the Siekierski et al patent, which describes the conversion of the battery voltage to digital data which is stored for comparison with new digital data developed later from conversion of the analog sum of the battery voltage and a predetermined reference increment which is introduced to avoid the effects of "jitter". The charge is terminated if the digital data derived from conversion of the analog sum are less than the stored data. In this system, the resolution of conversion, in volts per digital bit, must be greater than the value in volts of the predetermined reference increment which, in turn, must be greater than the magnitude of voltage variations or "jitter".

The Saar et al patents illustrate systems in which the inflection point is used as a criterion and the Taylor et al patent illustrates a system in which the criterion is the ratio of voltage differences developed in two periods following a charging pulse.

SUMMARY OF THE INVENTION

This invention was evolved with the general object of providing apparatus which is suitable for automatic, rapid, safe, reliable and efficient charging and discharging of batteries and which is easy to operate while being readily and economically manufacturable.

Although having other applications, the invention is especially directed to charging and conditioning of NIcad batteries of a relatively new class, capable of extremely rapid charge and discharge, with much higher currents than used previously and presenting special problems.

Important aspects of the invention relate to the use of digital and microprocessor circuitry for measurement and control and to the discovery and recognition of features of construction and operation of such circuitry to obtain optimum results. The system of the invention has a number of important features and advantages including improved control of the charging operation and rapid charging of batteries without overcharge thereof, the inclusion of a controlled discharge operation and also an autocycle discharge-charge operation, accurate monitoring of operating conditions and automatic detection and avoidance of conditions which might cause malfunctions. The system is versatile and is readily operated while being highly reliable.

With regard to improved control of the charging operation, it is found that in rapid charging of NIcad batteries, it is very important that the charge be terminated at the proper time, before any excessive charging of and/or damage to a battery can occur. Investigations and tests show that the aforementioned peak detection technique has a number of advantages over other possible techniques, including its relative simplicity, and that highly satisfactory results can be obtained, provided that the technique is properly used. Certain special problems must be overcome.

Tests of NIcad batteries in rapid charge conditions show that the voltage tends to increase very slowly in approaching a peak and that it also tends to decrease very slowly after a peak is reached, making it difficult to detect the exact magnitude of the peak and establish the time at which it occurs. However, it is also found to be very important that a fast charge operation be terminated within a short time after the peak is reached, no more than a few seconds at most. It is thus quite important that the voltage measurements be made precisely and accurately, with very high sensitivity. However, when highly sensitive means are used in an attempt to detect a peak condition and a subsequent very gradual drop, stability problems are introduced. In particular, in a system which used a microprocessor and in which the battery voltage is converted to digital data, sensitivity or resolution may be expressed or measured in terms of the voltage increment required to produce a change of one bit in the digital data. It is found that when the resolution is high, i.e. when the voltage increment per digital bit is very low, it is difficult to obtain stable operation for the reason that transient voltage variations may oftentimes be from more than two to several times the voltage increment per bit of the conversion operation. As a result and because the rate of increase of voltage is very low when approaching a peak, transient voltage variations may cause the charge to be terminated prematurely, long before the full charge condition is reached.

In accordance with the invention, these problems are overcome by introducing digital data which defines a threshold value and discontinuing the fast charge when current voltage is less than a stored peak voltage and when, in addition, the difference in corresponding digital data is greater than the threshold data. This arrangement is highly stable and reliable in operation. At the same time, it achieves high resolution measurement, precise and accurate detection and storage of the peak condition and accurate detection of a drop from the peak condition, so as to insure that the fast charge is discontinued within a very short time after the peak condition is reached.

In an illustrated embodiment, the battery voltage is converted to digital data with a resolution of about 9 mV per counter bit and a digital threshold value of 8 bits is used. Testing and control operations are performed periodically, at about 1 second intervals, for example. During each such operation, the current battery voltage digital data are entered into an accumulator or working register of a microprocessor and are compared with maximum value data stored in memory. The maximum value data are replaced by the new data when and only when the new data are greater. If the new data are less than the stored data, the difference is compared with the digital threshold value and if the difference is greater, application of a high charging current is discontinued. In the apparatus of the illustrated embodiment, the digital threshold value of 8 bits is found to be of sufficient magnitude to avoid premature shutdowns which might otherwise be caused by transient supply voltage variations and the like. At the same time, the conversion resolution of 9 mV per bit allows highly accurate detection of the peak voltage value and early detection of a slowly decreasing voltage after the peak condition is reached. It will be understood, of course, that such threshold and resolution values are given as examples and are not to be construed as limitations.

Thus, the charge control operation of the invention combines high resolution tracking of the battery voltage and continual and accurate updating of stored peak data with control being effected from a digital comparison of a digital threshold value and the difference between current and stored data, the resolution and the digital threshold value being such as to obtain optimum results In accordance with another feature of the invention, the system is operable in a pre-charge mode in which a relatively low charge current is applied. When the voltage at the battery terminals fails to increase at least a certain rate, the charge operation is discontinued and, preferably, an indication is provided that the battery is not capable of receiving a proper charge. Otherwise the normal fast charge mode of operation is initiated, a high charge current being supplied to the battery terminals.

Further features of the invention relate to the inclusion of a discharge operation in which a load is connected to the battery terminals to draw current from the battery, the load preferably including a transistor or other controllable device for control of the discharge current. The discharge operation is continued until a predetermined discharge condition is reached, preferably a condition in which the voltage at the battery terminals decreases at a rate exceeding a certain threshold value. Specific features relate to a further definition of the discharge condition as one in which the voltage is decreasing at a rate greater than a certain threshold value.

The inclusion of the discharge operation is highly advantageous in that a battery may be readily restored to full capacity by cycling it one or more times between full discharge and full charge. The inclusion of the discharge operation is further advantageous in that it permits computation of the capacity and efficiency of a battery through a determination of the energy delivered by the battery during a discharge operation, the energy supplied to the battery during a charge operation and the ratio of such energies. In accordance with the invention, the microprocessor is usable in connection with voltage-current monitoring circuitry and with a time measurement to compute the values of energies supplied and delivered and the ratio thereof. It is noted that since fixed criteria are used for terminating the discharge and charge operations, the computed battery capacities and efficiencies provide reliable standards for comparing the performances batteries and for determining whether a battery being tested is suitable for a particular purpose or whether it should be replaced.

Another feature of the invention is in the provision of an autocycle mode for unattended cycling of a battery through a discharge operation followed by a charge operation. The autocycle mode is usable in conjunction with the aforementioned capacity and efficiency measuring feature.

Additional features of the invention relate to the control of current to maintain current at a certain value which is preferably one of several values selected by the operator. Common circuitry is used in controlling both charge and discharge current, such circuitry including a resistance ladder network controlled by the microprocessor. Also, the same monitoring circuitry as used for measurement of the battery voltage is used for measurement of current, being connected to a resistor which is in series with the battery.

Additional important features relate to the making of voltage measurements, using a microprocessor, a real time counter and a VCO (voltage controlled oscillator). The VCO is operable to develop a cyclic output signal having a frequency or period proportional to the magnitude of a control voltage applied thereto and the microprocessor registers data corresponding to the number of counts which are registered by the real time counter during a predetermined integer number of cycles of the VCO output signal. The VCO is operable in a relatively low frequency range and the cost of providing the VCO and the counter is relatively low. In an illustrated embodiment, a commercially available microprocessor is used of a type which includes a real time. counter on the same chip, operable from the same clock signals used for operation of the microprocessor. At the same time, highly accurate measurements are obtained, with a high degree of reliability.

Specific features relate to the use of a real time counter of limited count capacity while at the same time obtaining very high resolution and accuracy and without using special integrated circuits or expensive components. One feature relates to the relationship between the count capacity of the real time counter, the number of VCO cycles during which a measurement operation is performed, the range of duration of the VCO cycles and the frequency of clock pulses applied to the real time counter. The relationship is preferably such that the range of duration of the measurement interval corresponds to the time required to produce a full count of the real time counter. With this relationship, the resolution of measurement may be maximized and, at the same time, the VCO may be operated in an optimum range from the standpoint of linearity and stability. Also, an available clock signal source for the real time counter, such as that provided by the microprocessor, may be used.

Another specific feature relates to the attainment of a count offset such that the range of registered data has a minimum value close to a zero value when the VCO cycle duration is at a minimum while having a maximum value close to the count capacity of the real time counter when the VCO cycle duration is at a maximum. The count offset may be readily obtained by pre-loading the real time counter with a predetermined count at the beginning of a measurement cycle.

Another important specific feature is in the use of a comparator to apply a voltage to the VCO, or to other analog to digital conversion means, which is proportional to the difference between an offset voltage and a voltage which is proportional to the input control voltage. Preferably, the offset voltage is controllable by the microprocessor in steps to divide the total range of voltages which may be measured into a number of adjacent ranges. In this way, each registered count of digital bit corresponds to a certain incremental voltage throughout the measurement range and a very high resolution is obtained. The voltage offset is readily obtained using an inexpensive resistance ladder network.

Still further features of the invention relate to ease of control of the various possible operational modes of the system and to the detection of conditions which might lead to a malfunction, to avoid damage to the circuitry or to a battery being charged or discharged. Also, a meter is provided having a scale such as to indicate the condition of charge of batteries having various different numbers of cells and to indicate the existence of a shorted cell.

These and other objects, features and advantages will become more fully apparent from the following detailed description taken in conjunction with the accompanying drawings.

DESCRIPTION OF A PREFERRED EMBODIMENT

Reference generally designates a charger

Figure 1:
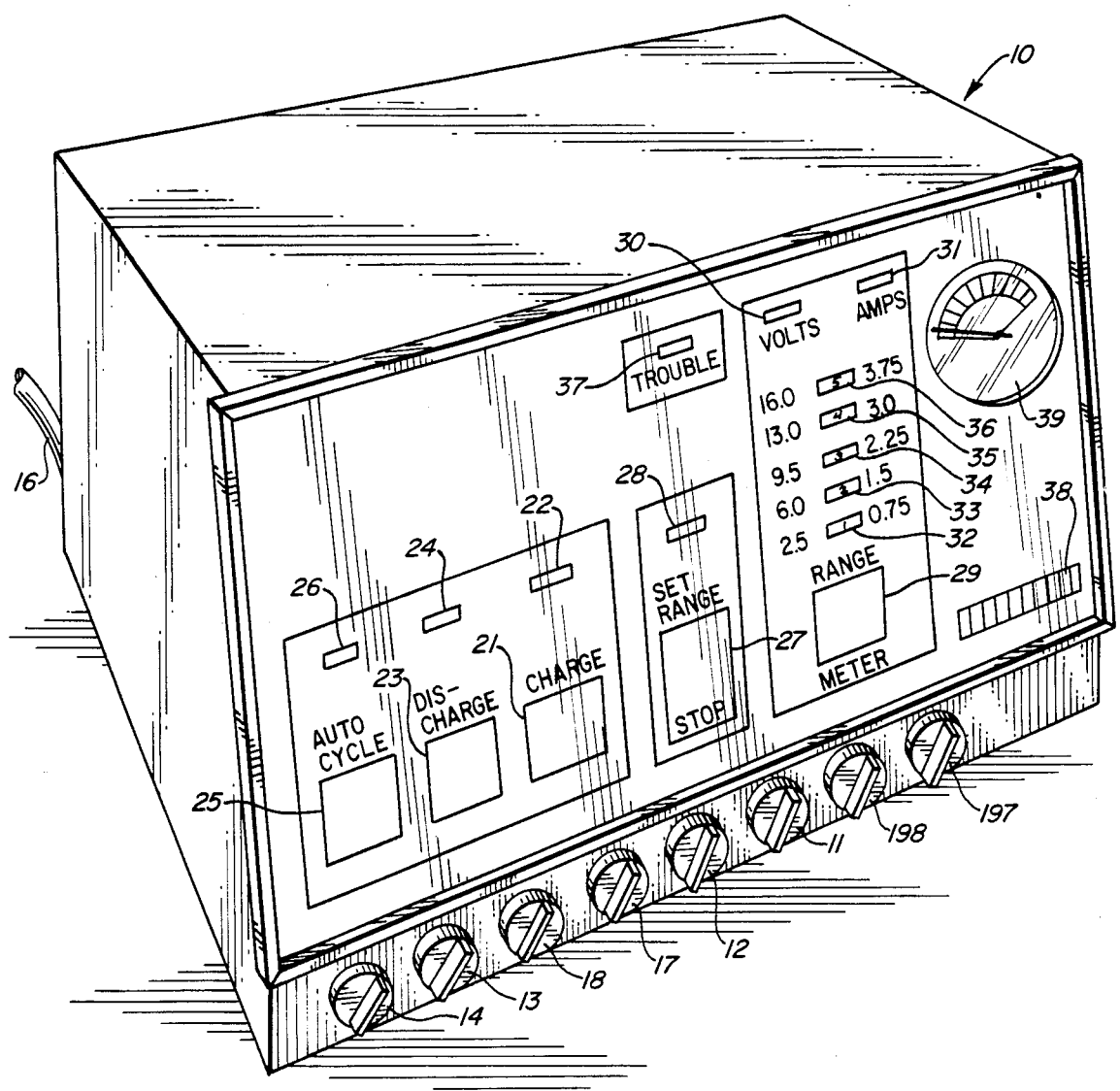
FIG. 1 is a perspective view of a charger unit which is constructed in accordance with the invention.

Reference numeral unit constructed in accordance with the principles of the invention. The illustrated unit 10 includes a pair of terminals 11 and 12 for connection to a single cell or battery to be charged or for connection to a plurality of cells or batteries in series. The unit may be supplied with power from a battery or other DC source connected to a pair of terminals 13 and 14 or through connection of a line cord 16 to a standard 120 volt 60 Hz source. A pair of terminals and 18 are provided for connection to an external ammeter, such terminals being connected by a jumper when no external meter is used.

A control panel 20 is provided which includes a "CHARGE" key 21 and an associated signal light 22, a "DISCHARGE" key 23 and an associated signal light 24, an "AUTOCYCLE" key 25 and an associated light signal 26, a "SET" key 27 and an associated signal light 28 and a "METER" key 29 and associated "VOLTS" and "AMPS" lights 30 and 31. A series of five lights 32–36 are provided to indicate levels or ranges of operation and a trouble or error light 37 is also provided. In addition, a digital display 38 is provided for indicating voltage or current and a meter 39 is provided for indicating the condition of charge of any battery which has from one to a certain number of cells, the meter 39 being usable for up to 10 cells in the illustrated embodiment.

In a typical operation of the unit, a battery is connected to the unit and power is supplied thereto. The SET key 27 is usable to select one of five current settings by successive closures, indicated by the vertical column of lights 32–36. Initially, the system is in a default condition at the lowest current setting, indicated by the lowermost light 32. After reaching the highest current setting, indicated by light 36, an additional closure of the SET key 27 returns the selection to the lowest setting. The selected setting dictates the current level for either a charge operation or a discharge operation.

When the CHARGE key 21 is pressed, the light 22 is energized and a charging operation is initiated. The system initially operates in a pre-charge mode in which a low charge current is supplied to the battery to test the battery and to determine whether the charge voltage increases as it should if the battery is in generally good condition. If an increasing voltage does not result after several attempts, the charge operation is aborted and the trouble or error light 37 is energized to alert the user that the battery was left uncharged and may be faulty.

A normal charge operation will cause application of a high charge current and will proceed until the charge voltage reaches its peak value whereupon charging is terminated. The light 22 is then deenergized and the SET light 28 is energized to show that the system is ready for a new operation.

The trouble or error light 37 may also be energized and a charge operation may be aborted in response to excessive temperature of the battery when a temperature sensor is mounted on the battery and connected to terminals forming a sensor port on the back of the unit. The same result may be produced by any input of an improper electrical nature to the sensor port, e.g. a manual switch to ground.

When the CHARGE key 21 has been pressed and the system is in the CHARGE mode, the vertical column of lights 32-36 are usable for other purposes. At this time, closure of the METER key 29 causes meter to cycle through three modes: VOLTS, AMPS and SET as indicated by lights 30, 31 and 28. In the AMPS mode, the range of charge current that the battery is presently receiving is indicated by one of the lights 32-36 and the actual reading is indicated by the display 38. Similarly, in the VOLTS mode, the charge voltage range is indicated by one of the lights 32-36 and the voltage is indicated by the display 38. In the SET mode, the energized light indicates which current range was selected.

If the SET key 21 is depressed while in the charge mode, or while it is in the discharge mode as hereinafter described, the system returns immediately to the SET mode and current flow to or from the battery is stopped.

When the DISCHARGE key 23 is pressed, the lamp 24 is energized and a discharge operation is initiated. Prior thereto, the user may select the discharge current setting to be used, in the same manner as in the charge operation, by using the SET key 27 and observing which of the lights 32-36 is energized. When the discharge operation is initiated, the unit draws the set current from the battery and continues to do so until the terminal voltage begins to drop sharply to signal a full discharge. Then the discharge is terminated, the SET light 28 being then deenergized.

Another mode of operation provides for unattended cycling of a battery through a discharge operation followed by a charge operation. This AUTOCYCLE mode is selected by pressing the AUTOCYCLE key 25, the light 26 being then energized. The battery is then discharged until a predetermined condition is reached and thereafter charged to the full charge condition. At all times, the battery is monitored and if abnormal characteristics are identified, the operation is a and the trouble or error light 37 is sorted energized. Normally, the battery will be left fully recharged and at full restored capacity, after using the AUTOCYCLE mode.

Figure 2:
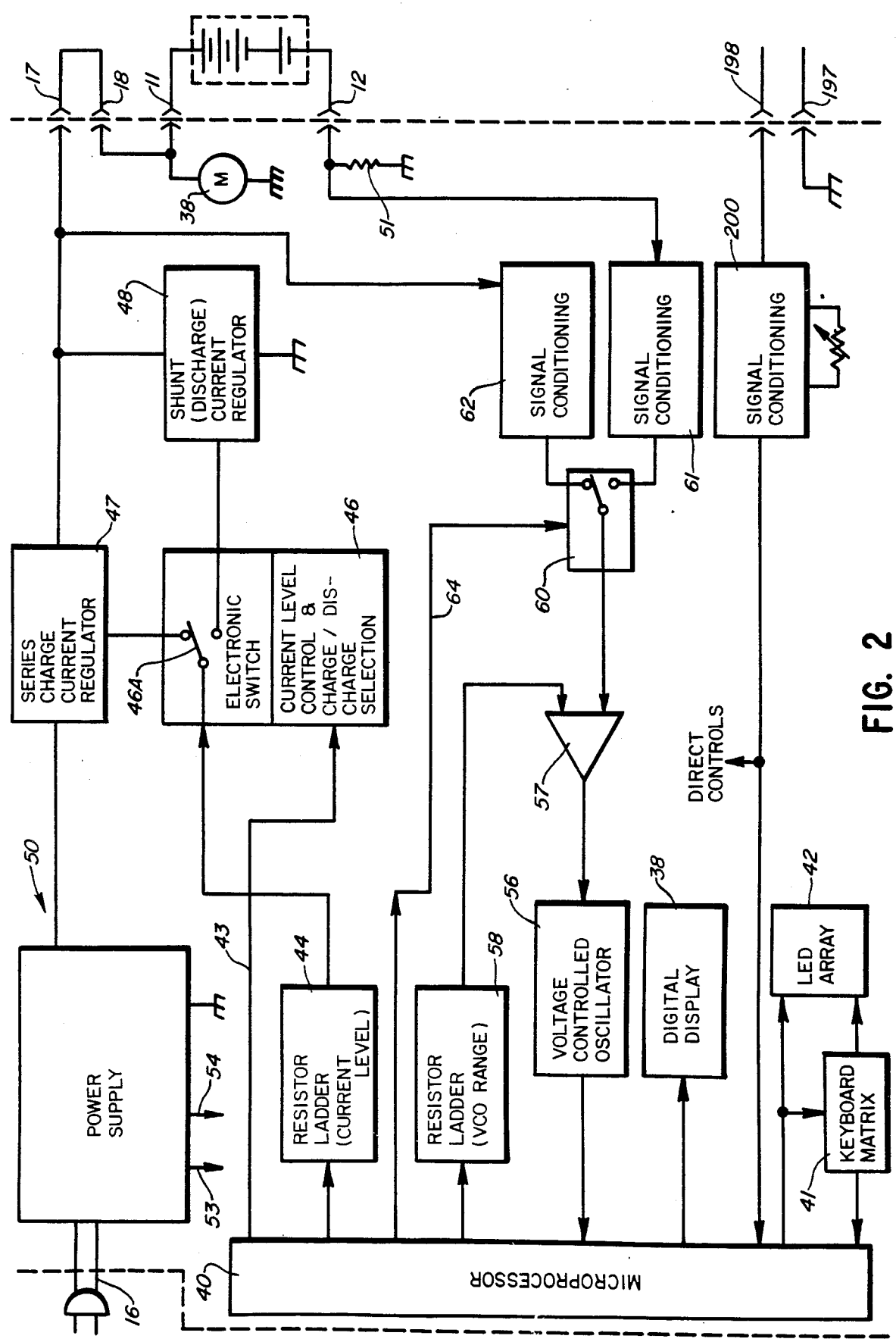
FIG. 2 is a functional block diagram of circuitry of the charger unit of FIG. 1.

FIG. 2 is a functional block diagram of circuitry of the charger unit. A microprocessor 40 is provided which is connected to a keyboard matrix 41, for monitoring of the actions of the various keys, and to a LED (light-emitting-diode) array 42 for energization of the various signal lights. Microprocessor 40 is also connected through a charge/discharge select line 43 and through a resistor ladder 44 to a charge/discharge selection and current level control circuit 46. The resistor ladder circuit 44 supplies a signal at a certain level which is determined by the current setting selected through operation of the set key 27 and indicated by one of the lights 32-36. As diagrammatically illustrated, this signal is applied through an electronic switch 46A of the circuitry 46, either to a charge current regulator 47 or a discharge current regulator 48. The charge current regulator 47 is connected in series between power supply circuitry 50 and ammeter terminal 17 which may be connected through an external ammeter or through a jumper as shown to the terminal 18 which is connected to the battery terminal 11. The other battery terminal 12 is connected through a current sensing resistor 51 to ground. The discharge current regulator 48 is connected in shunt relation to the battery, being connected to the terminal 17 and to ground. As indicated, the power supply circuitry is connected to ground and also to the external DC supply terminal 13, the terminal 14 being connected to ground. Power supply 50 is also connected to the line cord 16 for connection to a standard 120 volt 60 Hz source and it is arranged to supply +5 volt and +8 volt regulated voltages on lines 53 and 54 for operation of the microprocessor 40 and for operation of certain linear circuits as hereinafter described.

The voltage across the current sense resistor 51 and the battery voltage are monitored through an arrangement which includes a VCO (voltage-controlled oscillator) 56 which is connected to the output of a VCO ranging amplifier 57, one input of amplifier 57 being connected to the output of a resistor ladder 58 which is connected to the processor 40. As diagrammatically illustrated, a second input of the VCO ranging amplifier 57 is connected through an electronic switch circuit 60, either to the output of a signal conditioning circuit 61 which is connected to the current sense resistor 51 or to the output of a signal conditioning circuit 62 which is connected to the terminal 17. The electronic switch circuit 60 is controlled from the microprocessor through a line 64 to continually switch between the two signal conditioning circuits 61 and 62 and to apply a voltage to the VCO ranging amplifier which is proportional either to the battery current or the battery voltage. As hereinafter described, the microprocessor 40 includes an internal real time counter operated in conjunction with the VCO 56 to effect registration of digital data which corresponds to the analog voltage applied to the VCO ranging amplifier 57 from the switch 60. The resistor ladder 58 is controlled by the microprocessor 40 to supply an offset voltage such that the effective range of voltage applied to the VCO 56 is limited with the total voltage-measurement range being divided into a number of adjacent ranges. The result is that high resolution is obtained over a wide voltage range using available and relatively inexpensive circuitry.

As also illustrated in the functional block diagram of FIG. 2, the microprocessor 40 is connected to the digital display 38.

Figure 3:
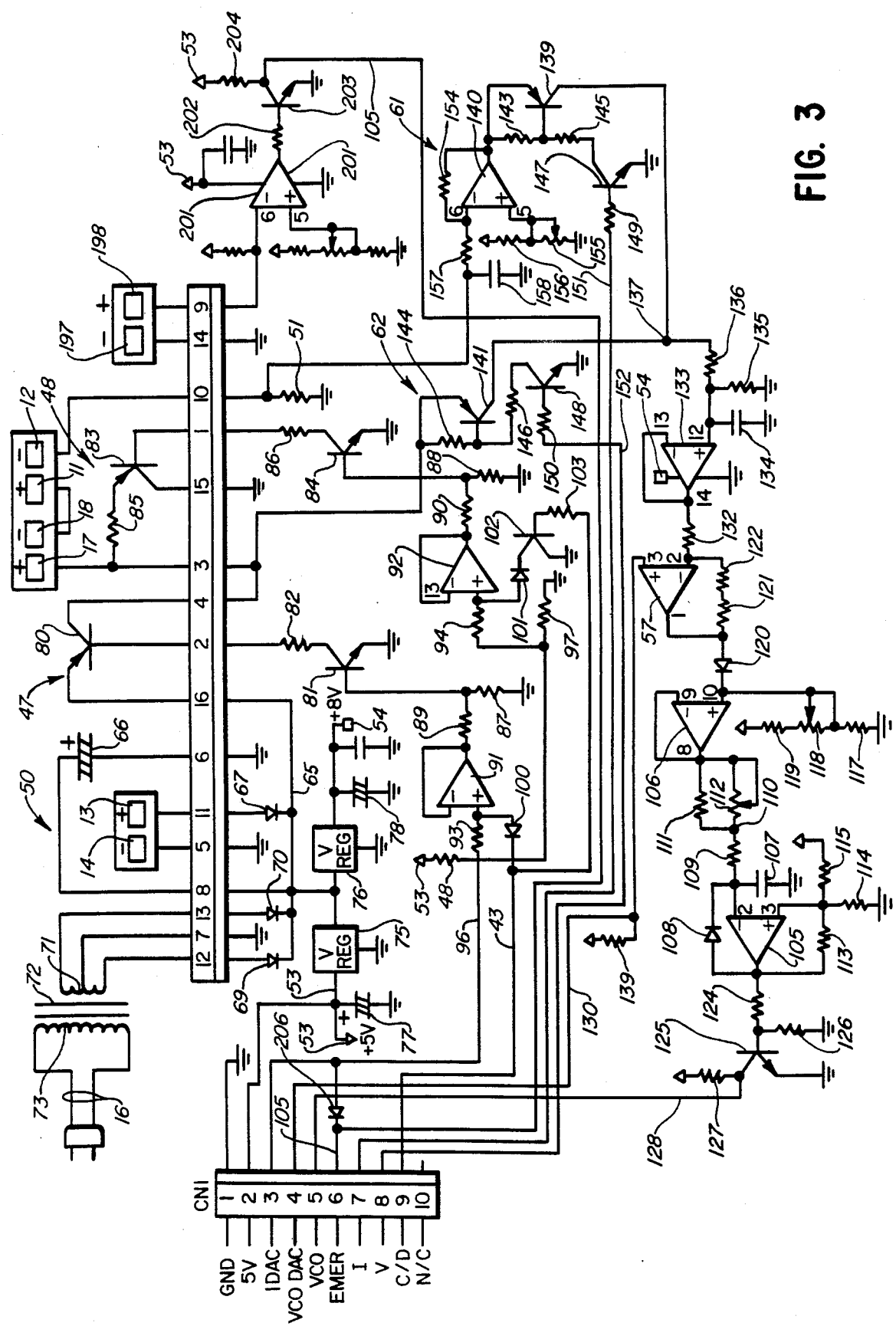
FIG. 3 is a schematic diagram of linear circuits of the circuits shown in block form in FIG. 2.

FIG. 3 is a schematic diagram of linear circuitry of the unit. The power supply circuitry 50 includes an output bus 65 which is connected through a capacitor 66 to ground. It is also connected through a blocking diode 67 to the battery terminal 13 and through a pair of rectifying diodes 69 and 70 to opposite ends of a secondary winding 71 of a transformer 72 which has a primary winding 73 connected to the line cord 16, the secondary winding 71 having a center tap connected to ground. The bus 65 is also connected to inputs of two voltage regulators 75 and 76 which develop the +5 and +8 volt regulated voltages on the lines 53 and 54, line 53 being connected through a capacitor 77 to ground and line 54 being connected through capacitors 78 and 79 to ground.

The output bus 65 is connected to the emitter of a transistor 80 which has a collector connected to the terminal 17 and which cooperates with a control transistor 81 to form the charge current regulator 47. The collector of transistor 81 is connected through a resistor to the base of the transistor 80 and its emitter is connected to ground.

The shunt current regulator 48 is formed by a resistor 83 and a cooperating control transistor 84. The emitter of transistor 83 is connected through a resistor 85 to the terminal 17 and its collector is connected to ground with the base thereof being connected through a resistor 86 to the collector of transistor 84 and with the collector of transistor 84 being connected to ground. During charge operation, a positive voltage is applied to the base of the transistor 81 to obtain a controlled current flow through the series transistor 80. Similarly, during the discharge operation, a positive voltage is applied to transistor 84 to obtain a controlled current flow through the shunt transistor 83.

The bases of transistors 81 and 84 are respectively connected through resistors 87 and 88 to ground and through resistors 89 and 90 to the outputs of two operational amplifiers 91 and 92, the minus inputs of amplifiers 91 and 92 being connected directly to the outputs thereof. The plus inputs of amplifiers 91 and 92 are connected through resistors 93 and 94 to a control line 96 which is connected through a resistor 97 to ground and through a resistor 98 to the +5 volt power supply line 53. The plus input of amplifier 91 is also connected through a diode 100 to the charge/discharge select line 43 while the plus input of amplifier 92 is connected through a diode 101 to the collector of a transistor 102 which has a grounded emitter and which has a base connected through a resistor 103 to the charge/discharge select line 43. When the line 43 is at a high level, the diode 100 is non-conductive and the amplifier 91 is operative to apply a positive control voltage to the control transistor 81. At the same time, the transistor 102 is rendered conductive to render the diode 101 conductive and to preclude operation of the amplifier 96. When the line 43 is brought low, the operation is reversed, the amplifier 91 being inoperative and the amplifier 92 being effective to control the flow of current through the shunt regulator transistor 83. Thus, the switching action as diagrammatically indicated by switch 46A is obtained.

The voltage controlled oscillator 56 includes two operational amplifiers 105 and 106. The minus input of amplifier 105 is connected through a capacitor 107 to ground, through a diode 108 to its output terminal and through a resistor 109 to a circuit point 110 which is connected through a fixed resistor 111 and a parallel adjustable resistor 112 to the output of amplifier 106, the output of amplifier 106 being connected to its minus input. The plus input of amplifier 105 is connected through a resistor 113 to its output, through a resistor 114 to ground and through a resistor 115 to the power supply line 53. The plus input of amplifier 106 is connected through a resistor 117 to ground and through an adjustable resistor 118 and a fixed resistor 119 to the power supply line 53. Also, the plus input of amplifier 106 is connected through a diode 120 to the output of an operational amplifier which forms the VCO ranging amplifier 57 shown in FIG. 2, the output of amplifier of 57 being connected through a pair of resistors 121 and 122 to its negative input. The VCO formed by the operational amplifiers 105 and 106 and associated circuit components is operative over a frequency range which is controlled by adjustment of the resistors 112 and 118, the resistor 112 being effective to provide a high stop adjustment and the resistor 118 being effective to provide a low stop adjustment.

The output of the VCO, developed at the output of the amplifier 105 is applied through a resistor 124 to the base of a transistor 125 which operates as a buffering and inverting stage. Its base is connected through a resistor 126 to ground, its emitter is connected directly to ground and its collector is connected through a resistor 127 to the line 53 and also to an output line 128 which is connected to the microprocessor 40.

Figure 4:
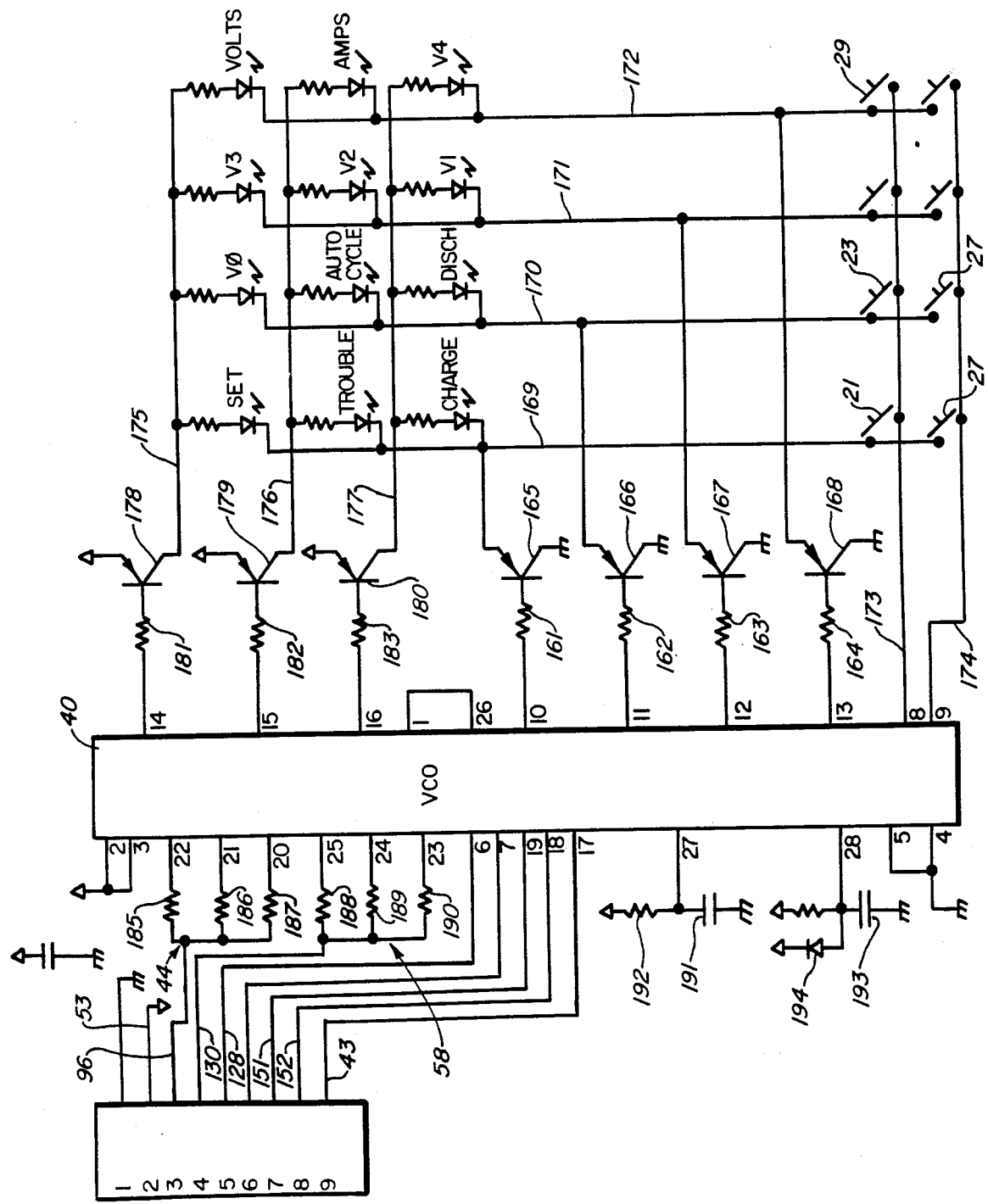
FIG. 4 is a schematic diagram of digital circuitry shown in block form in FIG. 2.

The frequency of operation of the VCO, over its operative range, is substantially a linear function of the voltage applied to the plus input of amplifier 106 which, in turn, is a function of the difference in voltages applied to the plus and minus inputs of the VCO ranging amplifier 57. The plus input of the ranging amplifier 57 is connected through a resistor 129 to the line 53 and is also connected through a line 130 to the output of the resistor ladder 58 which is shown in FIG. 4 and which is described hereinafter. The minus input of amplifier 57 is connected through a resistor 132 to the output of an operational amplifier 133 which has a minus input connected to its output and which has a plus input connected through a resistor 134 and a parallel capacitor 135 to ground and also through a resistor 136 to a circuit point 137. A voltage is applied at circuit point 137 which is proportional either to the voltage across the current sense resistor 51 or to the battery voltage at terminal 17.

In the current sense operation, a transistor 139 is rendered conductive to connect the output of an operational amplifier 140 to circuit point 137, a negative input of amplifier 140 being connected to the current sense resistor 51. In the voltage sense operation, a transistor 141 is rendered conductive to connect circuit point 137 to the terminal 17.

To render transistors 139 and 141 conductive, the bases thereof are connected through resistors 143 and 144 to the emitters thereof and through resistors 145 and 146 to the collectors of transistors 147 and 148 which have grounded emitters and which have bases connected through resistors 149 and 150 to control lines 151 and 152 which are connected to output ports of the microprocessor 40.

The transistors 147 and 148 thus provide the functional equivalent of the signal select switch 60 shown diagrammatically in the functional block diagram of FIG. 2 and the transistor 139 together with the amplifier 140 forms the signal conditioning circuit 61 while the transistor 141 forms the signal conditioning circuit 62. The signal conditioning circuit 61 has additional components including a resistor 154 connected between the minus input of amplifer 140 and its output, an adjustable resistor 155 connected between the plus input of amplifier 140 and ground, a resistor 156 connected between the plus input of amplifier 140 and the line 53, a resistor 157 connected between the minus input of amplifier 140 and the current sense resistor, and a capacitor 158 connected across the current sense resistor 51.

The circuitry of FIG. 3 is connected to the microprocessor 40 and associated digital circuitry through connectors shown at the left side of FIG. 3 and at the left side of FIG. 4. As shown in FIG. 4, four output ports of the microprocessor 40 are connected through four resistors 161–164 to the bases of four transistors 165–168 which have grounded collectors and which have emitters collected to four column lines 169–172. A pair of input ports are connected to lines 173, contacts of the CHARGE key 21, DISCHARGE key 23 and METER or MODE key 29 being connected between line 173 and the column lines 169, 170 and 172 while contacts of the SET key 27 and the AUTOCYCLE key 25 are connected between line 174 and the column lines 169. By selective control of the output ports connected to resistors 162–164 and by sensing the signals on lines 173 and 174, the depression of one of the keys may be ascertained.

The lights 22, 24, 26, 28 and 30–37 are all in the form of light-emitting diodes which have cathodes connected to column lines 169–172 in the manner as shown and which have anodes connected through resistors to row lines 175, 176 and 177 which are connected to the collectors of transistors 178, 179 and 180, the bases of transistors 178, 179 and 180 being connected through resistors 181, 182 and 183 to output ports of the microprocessor 40. The current level resistor ladder 44 is formed by three resistors 185–187 which are connected between the line 96 and output ports of the microprocessor 40. Similarly, the VCO range resistor ladder 58 is formed by three resistors 188–190 which are connected between the line 130 and other output ports of the microprocessor 40. Additional output ports of the microprocessor are connected to the control lines 151 and 152 to control whether the monitored voltage is proportional to battery current or battery voltage and another output port is connected to the charge/discharge control line 43.

Another port of the microprocessor 40, operative as an input port, is connected to the output line 128 of the microprocessor 40.

As also shown in FIG. 4, an oscillator terminal of the microprocessor is connected through a capacitor 191 to ground and through a resistor 192 to the line 53. A reset terminal is connected through a capacitor 193 to ground and through a resistor 194 in parallel with a diode 195 to the line 53.

Provision is made for connecting the unit to a temperature sensor which may be physically mounted on or in proximity to a battery being charged or conditioned. Such a sensor may be connected to terminals 197 and 198 shown in FIGS. 1 and 3, terminal 197 being grounded and terminal 198 being connected to the input of a signal conditioning circuit generally designated by reference numeral 200. The circuit 200 includes an operational amplifier 201 and input circuitry similar to that of the operational amplifier 140 of the signal conditioning circuit 61. The output of amplifier 200 is connected through a resistor 202 to the base of a transistor 203 which has a grounded emitter and which has a collector connected through a resistor 204 to the line 53. The collector of transistor 203 is connected to a line 205 which is connected to an input port of the microprocessor 40 and which is also connected through a diode 206 to the line 96. When a sensor connected to terminals 197 and 198 applies a control signal, in response to an excessive temperature condition for example, the transistor 203 is rendered conductive to bring the line 205 to a low condition for detection by the microprocessor and also to bring the line 96 low and to prevent conduction of either charge or discharge current.

The microprocessor 40 of the illustrated embodiment is a General Instrument Type PIC1655A microcomputer which includes a real time clock counter and which has four input lines, eight output lines and, in addition, eight lines which are operative as either input or output lines under program control. Table I, set forth hereinafter, is a program listing for implementing operation of the system and FIGS. 5–11 are corresponding flow diagrams.

Figure 5:
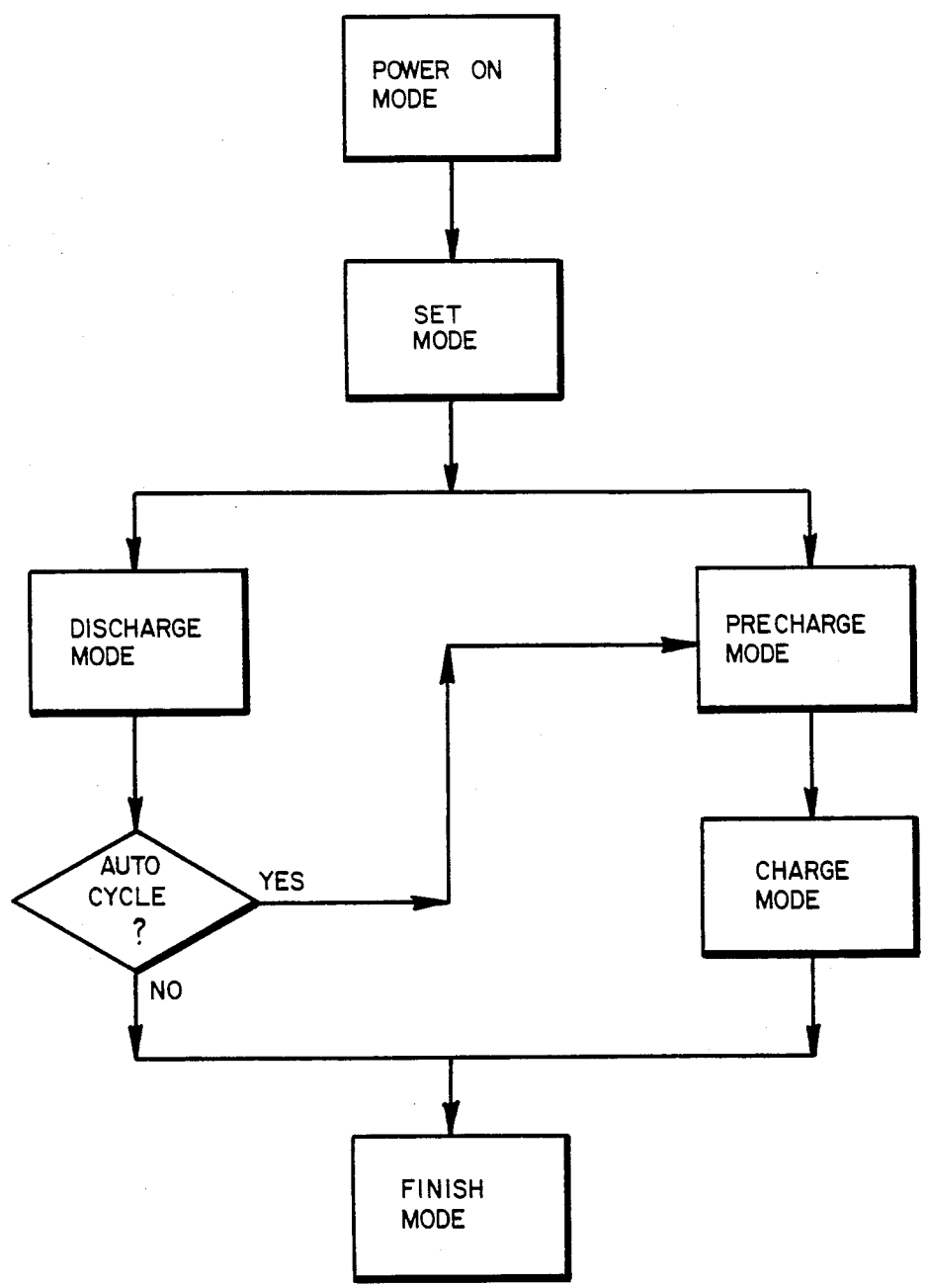
FIG. 5 is a system mode flow diagram, illustrating the general operation of the system.
Figure 6:
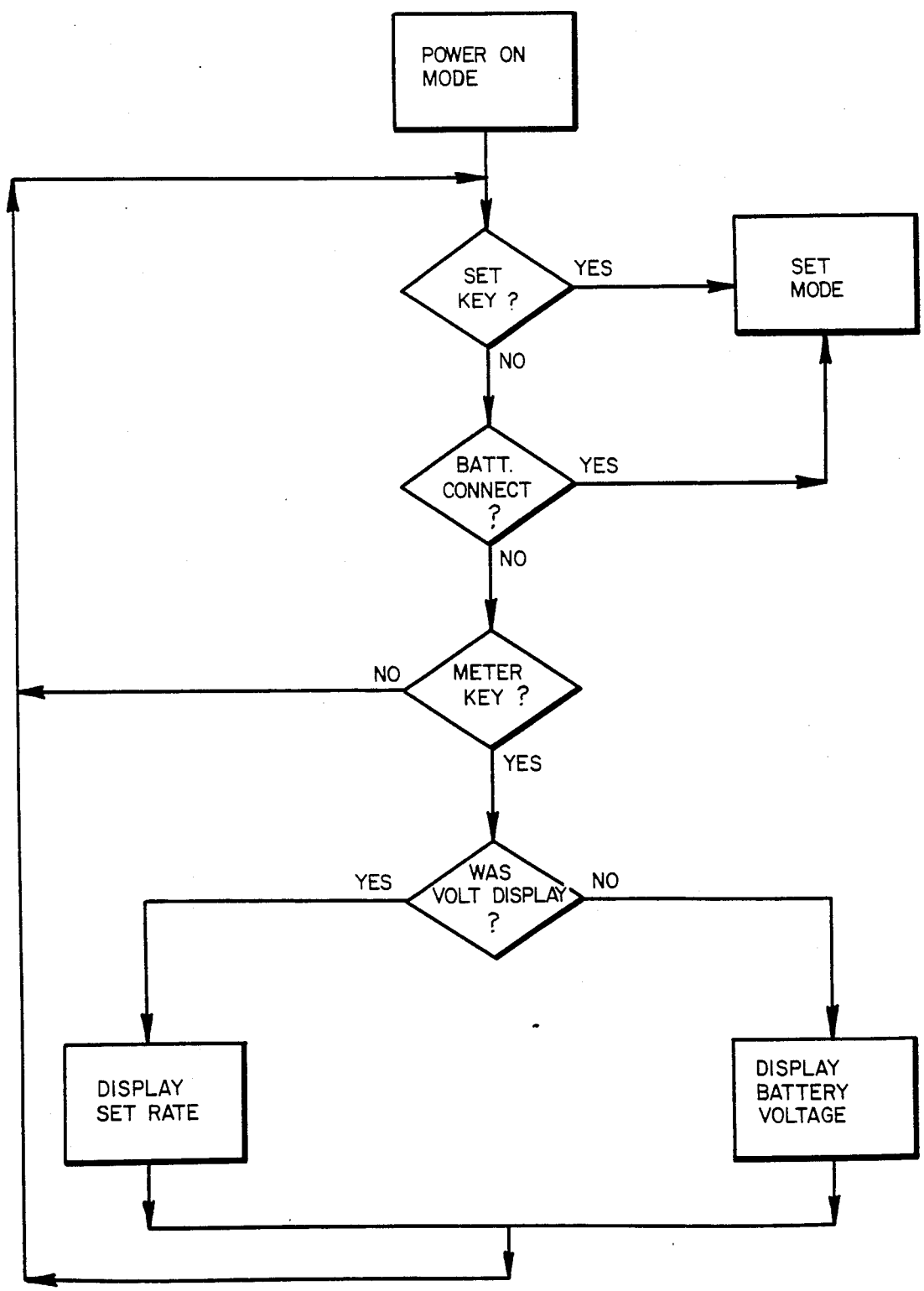
FIG. 6 is a flow diagram illustrating a power-on mode of operation.
Figure 7:
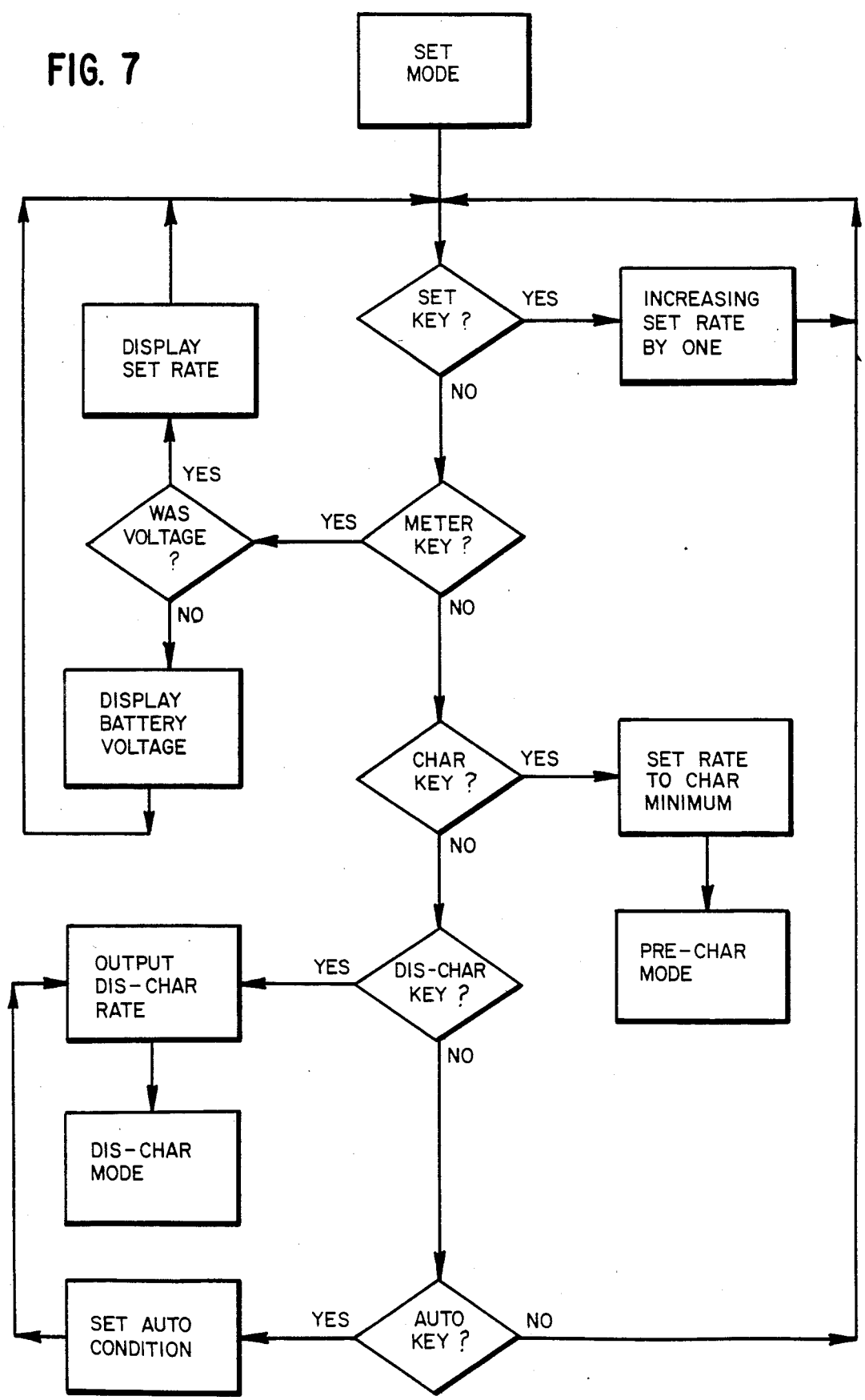
FIG. 7 is a flow diagram illustrating a set mode of operation.
Figure 8:
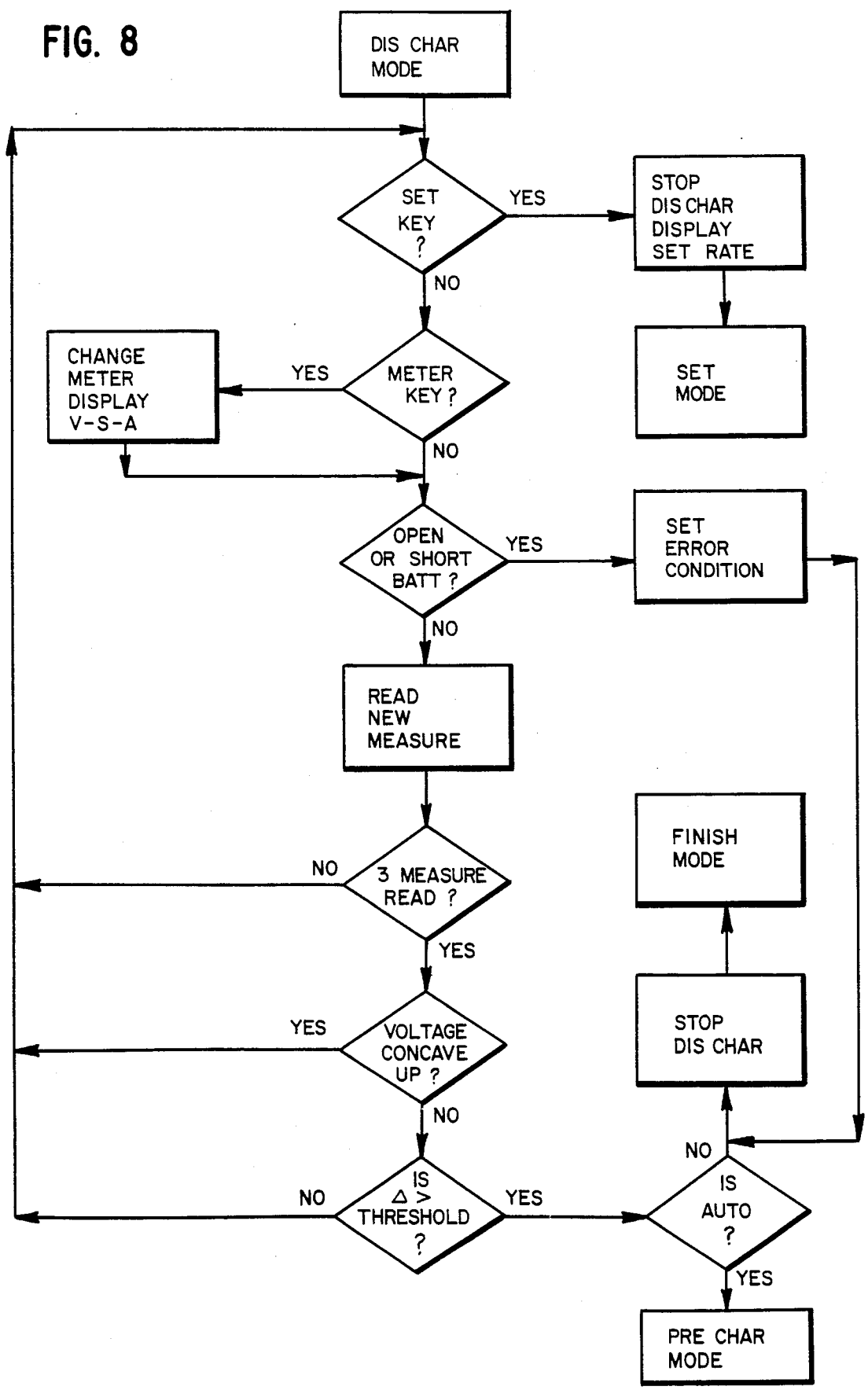
FIG. 8 is a flow diagram illustrating a discharge mode of operation.
Figure 9:
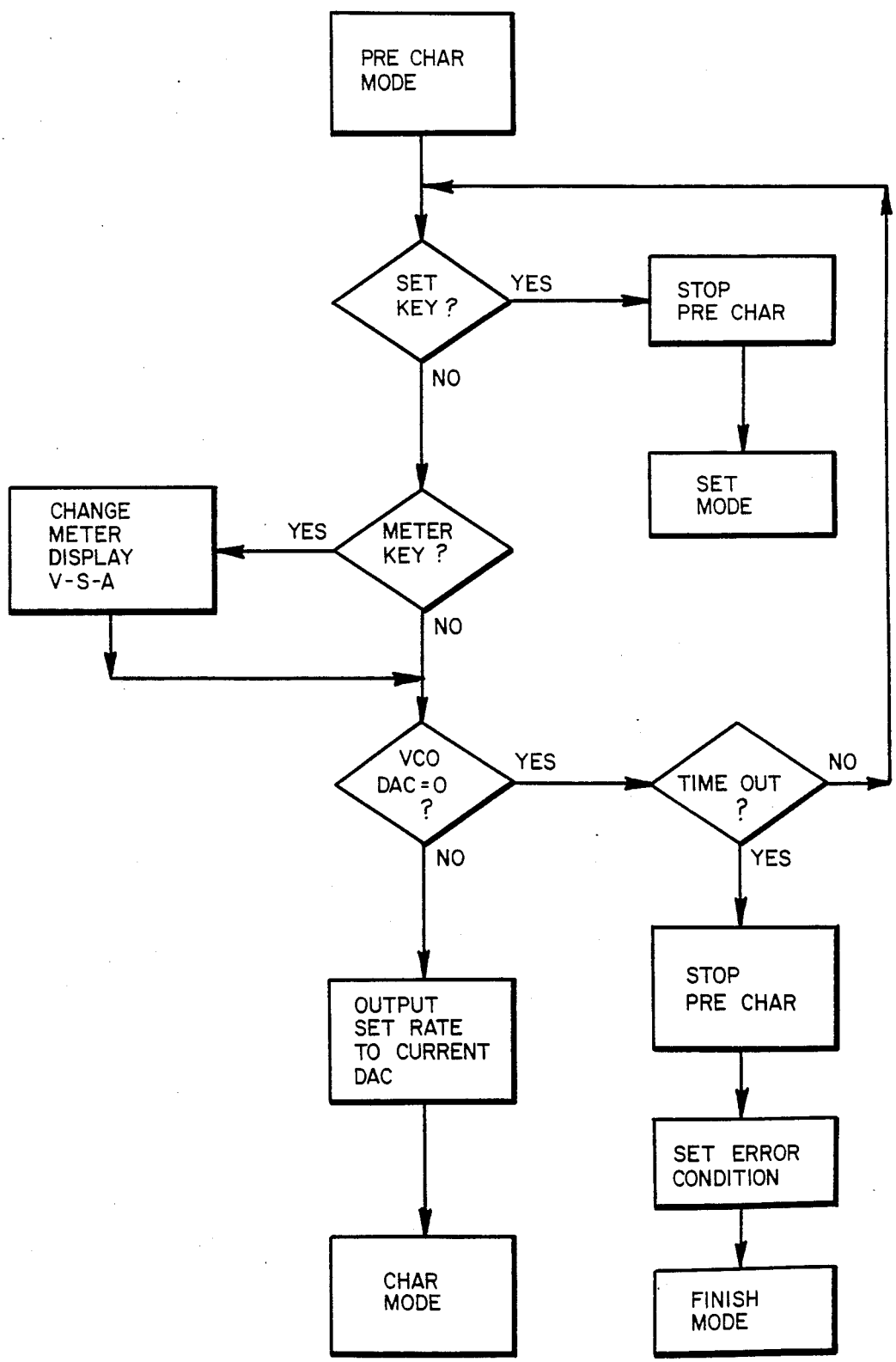
FIG. 9 is a flow diagram illustrating a pre-charge mode of operation.
Figure 10:
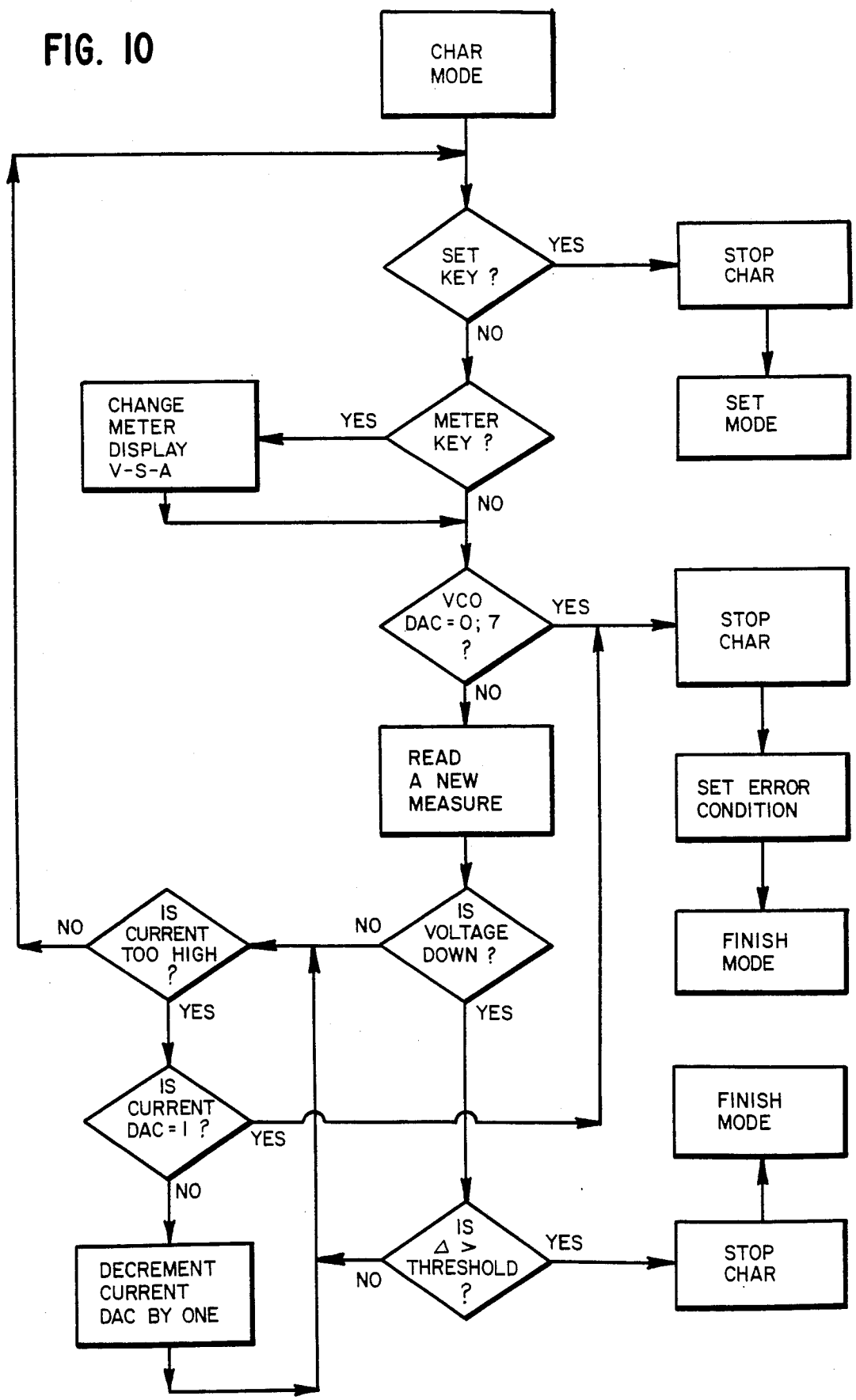
FIG. 10 is a flow diagram illustrating a charge mode of operation.
Figure 11:
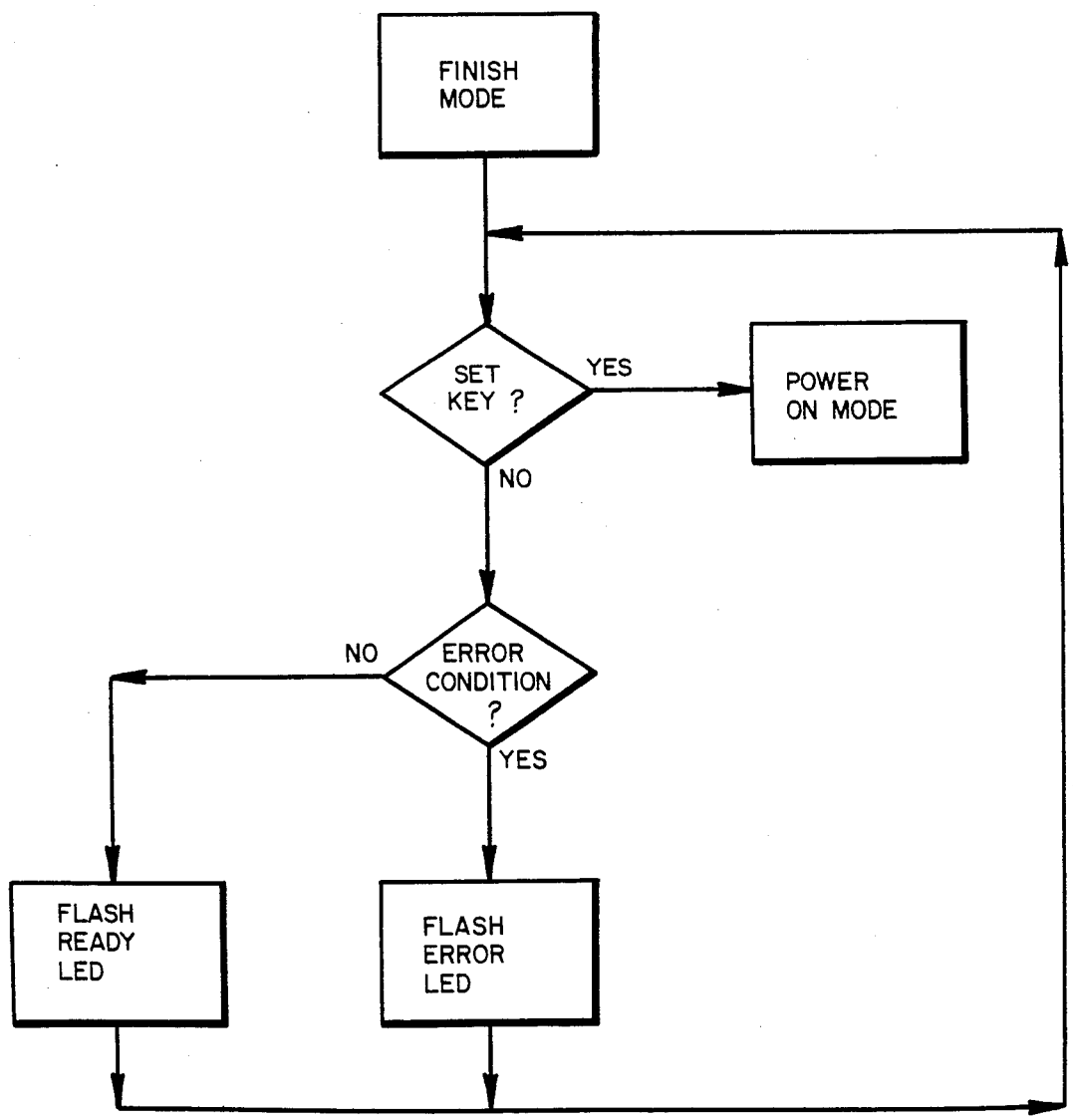
FIG. 11 is a flow diagram illustrating a finish mode of operation.

FIG. 5 shows the overall operation and FIG. 6 shows a power-on mode of operation. FIG. 7 shows how current-setting, display, charge, discharge and autocycle operations are initiated in response to operation of the various keys. FIG. 8 shows a discharge operation performed either in direct response to operation of the discharge key 23 or after a charge operation when the autocycle mode has been initiated by operation of the autocycle key 25. FIG. 9 shows a precharge operation which is performed in response to operation of the charge key. If a current measurement shows that the battery will not accept a charge when a low current is applied for a certain time interval, the precharge operation is stopped, an error condition is displayed and a finish mode of operation is initiated. If the battery will accept a charge, a high charge current is applied at a set rate and a charge mode of operation of FIG. 10 is initiated. In the charge mode of operation, a determination is made as to whether the voltage has decreased and whether, at the same time, the decrease is more than a threshold digital value which is an actal 1∅ or decimal 8 using the program of Table I. If so, the charged operation is stopped and a finish mode of operation of FIG. 11 is initiated.

Figure 12:
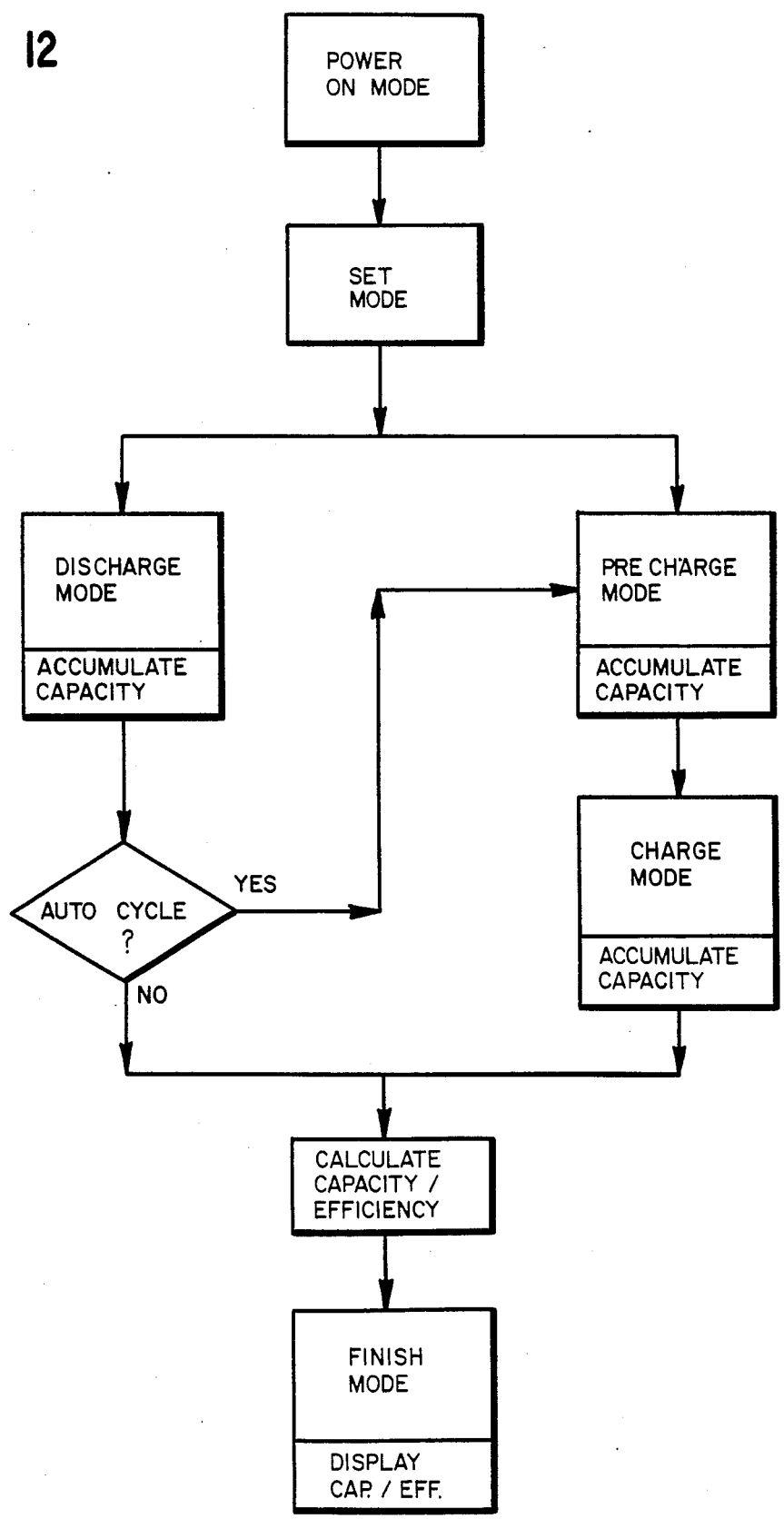
FIG. 12 is a system mode flow diagram similar to FIG. 5 but illustrating a modification in which the capacity and efficiency of a battery are determined.
Figure 13:
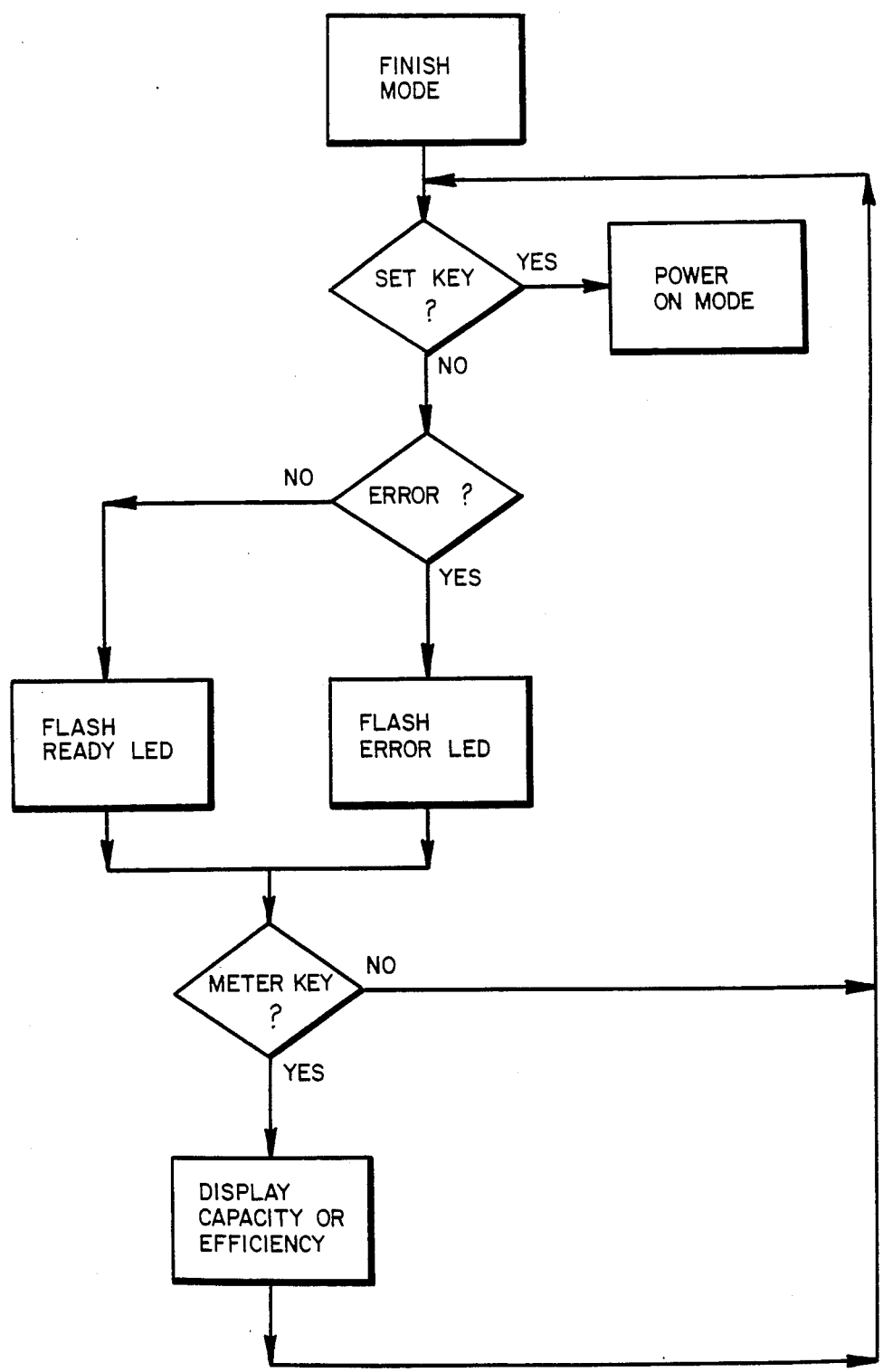
FIG. 13 is a flow diagram similar to FIG. 11 but illustrating a finish mode of operation of the modification of FIG. 12.
Figure 14:
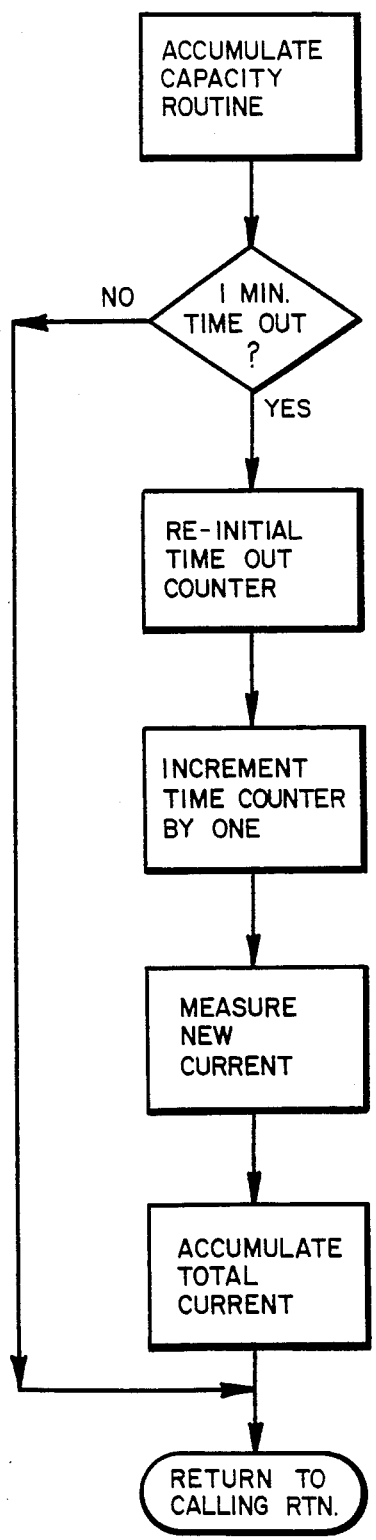
FIG. 14 is a flow diagram illustrating an accumulate capacity routine usable in the modification of FIG. 12.
Figure 15:
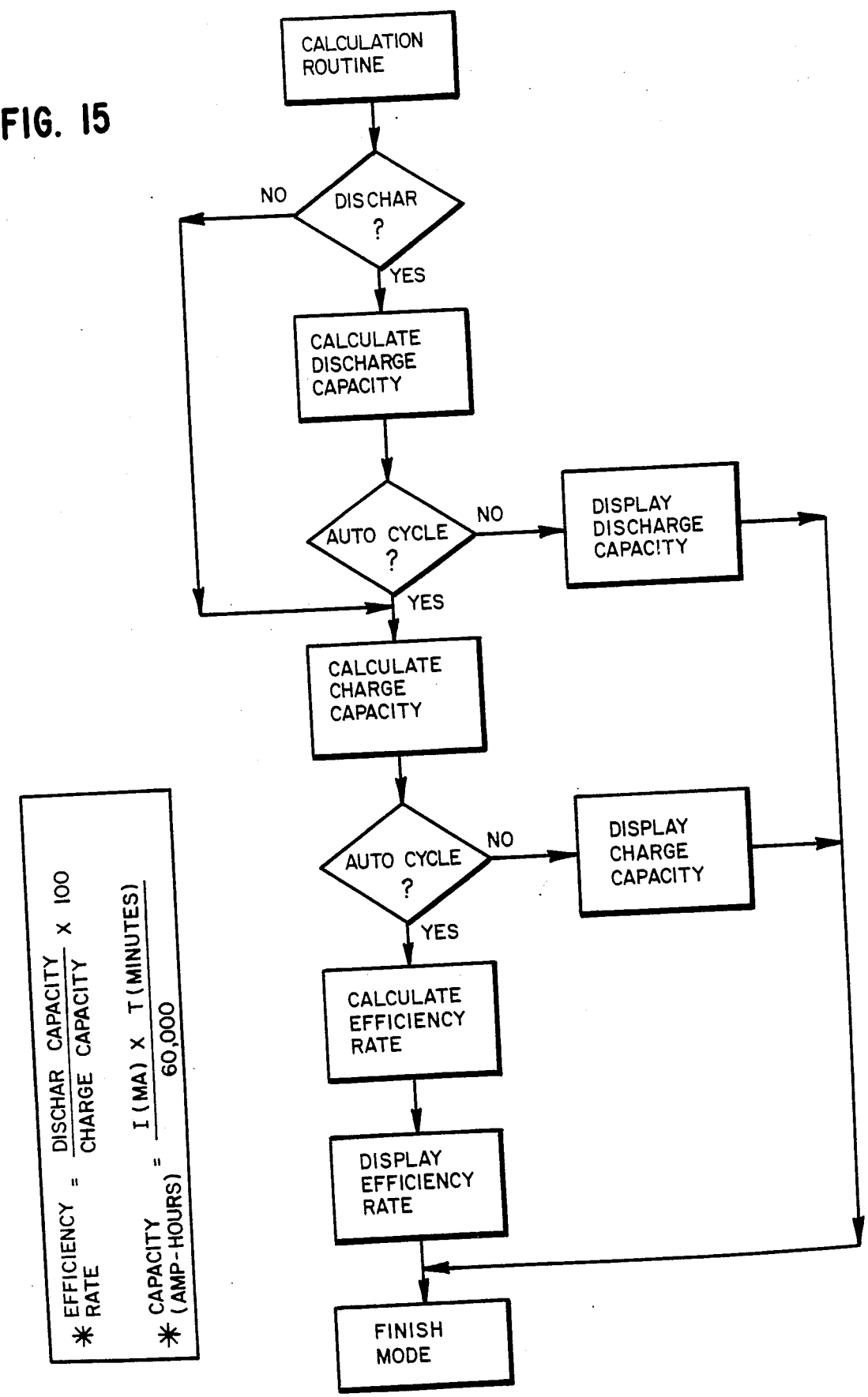
FIG. 15 is a flow diagram illustrating a calculation routine of the modification of FIG. 12.

FIGS. 12, 13, 14 and 15 are flow diagrams illustrating a modified operation which is not implemented in the program as listed in Table I but which may be added thereto. FIG. 12 is a system mode diagram similar to FIG. 5 but showing the addition of accumulate capacity routines to the discharge mode, pre-charge mode and charge mode operations, each accumulate capacity routine being as shown in FIG. 14. A calculation routine as shown in FIG. 15 is performed prior to a finish mode which, as shown in FIG. 13, includes a display of capacity and/or efficiency. As indicated in FIG. 14, a one-minute timeout timer is used in the illustrated system and when the current measurements are in milliamperes, it is necessary to divide the accumulated energy in milliampere ammeter by a conversion factor of 60000 to obtain capacity in ampere hours. It will be understood that the current measurements need not be in milliamperes and thereby intervals of other than one-minute may be used.

The inclusion of the meter 39 is advantageous in providing a check on the operation of the system and also in providing a memo for quickly and reliably determining the existence of shorted cells. The dial of the meter has index marks corresponding to a plurality of equal voltage divisions, each equal to the no-load voltage of one cell of the type of battery to be processed, thereby dividing the dial into contiguous ranges which are indicated by consecutive numbers. If the number of the range indicated by the meter is less than the number of cells of a battery, it indicates the existence of one or more shorted cells. v,10/999

TABLE I

```
1.        ;$$$$$$$$$$$$$$$$$$$$$$$$$$$$$$$$$$$$$$$$$$$$$$$$$$$$$$$$$$
2.        ;
3.        ;   SMART CHARGER
4.        ;
5.        ;   copyright  SPAN inc   March 1986
6.        ;
7.        ;   by WB & PC
8.        ;
9.        ;$$$$$$$$$$$$$$$$$$$$$$$$$$$$$$$$$$$$$$$$$$$$$$$$$$$$$$$$$$
10.       ;
11.              LIST    P=1655
12.              LIST    X,E
13.       ;
14.       ;
15.       ;  equates
16.       ;--------------------
17.       ;
18.       ;   I/O
19.       ;
20. 0006  STROB   EQU     6       ;SEGMENT & STROBE OUTPUTS, PORT B
21. 0005  RETS    EQU     5       ;KEY RETURNS & DIRECT INPUTS, PORT A
22. 0007  CONT    EQU     7       ; CONTROL OUTPUTS, PORT C
23.       ;
24.       ;  memory
25.       ;
26. 0004  DIGPTR  EQU     4       ;DIGIT POINTER (FSR)
27. 0010  TEMP1   EQU     10      ;SCRACH
28. 0011  KEY     EQU     11      ;KEY READY FOR PROCESSING
29. 0012  KEYQ    EQU     12      ;KEY IN DEBOUNCE
30. 0013  FLAGS   EQU     13      ;FLAG REGISTER
31.       ;
32. 0014  DIG1    EQU     14      ;MS NIBBLE IS SEGMTS
33. 0015  DIG2    EQU     15      ;LS NIBBLE IS STROBE POSITION
34. 0016  DIG3    EQU     16      ;----"----
35. 0017  DIG4    EQU     17      ;----"----
36.       ;
37. 0020  CNTR    EQU     20      ; LED TOGGLE COUNTER
38. 0021  MODE    EQU     21      ; SYSTEM MODE, VECTOR
39. 0001  RTCC    EQU     1       ; REAL TIME COUNTER
40. 0022  TEMP2   EQU     22      ; SCRATCH #2
41. 0023  TEMP3   EQU     23      ; SCRATCH #3
42. 0024  RATE    EQU     24      ; CHARGE/DISCRG RATE
43. 0025  VCOCC   EQU     25      ;VCO CYCLE COUNT
44. 0026  METER   EQU     26      ;METER MODE
45. 0027  DELT1   EQU     27      ;MEASUREMENT
46. 0030  DELT2   EQU     30
47. 0031  M1      EQU     31      ;MEASUREMENT
48. 0032  M2      EQU     32
49. 0033  M3      EQU     33
50. 0034  TEST    EQU     34      ;MEAS. COUNT
51. 0036  TEMP4   EQU     36      ;SCRATCH #4
52. 0037  RSAVE   EQU     37      ;SET CONTROL RATE
53.       ;
54.       ;  constants
55.       ;
56. 0041  CRG     EQU     041     ; KEY CODES
57. 0021  SET     EQU     021
58. 0042  DCRG    EQU     042
59. 0022  AUTO    EQU     022
```

```
60.  0050         METR    EQU    50
61.                ;
62.                ;
63.  0000         FREQJ   EQU    0         ; MODES REF JUMP TABLE
64.  0001         SETJ    EQU    1
65.  0002         CRGJ    EQU    2
66.  0003         DCRGJ   EQU    3
67.  0004         FWONJ   EQU    4
68.  0005         FINJ    EQU    5
69.                ;
70.                ; bit positions
71.                ;
72.                ; digit 1
73.  0006         RDYL    EQU    6         ;READY MODE LED (SEG)
74.  0005         ERRL    EQU    5         ;ERROR
75.  0004         CRGL    EQU    4
76.                ;
77.                ; digit 2
78.  0006         V0      EQU    6         ;LOWEST AMPLITUDE LED
79.  0005         AUTOL   EQU    5
80.  0004         DCRGL   EQU    4
81.                ;
82.                ; digit 3
83.  0006         V3      EQU    6
84.  0005         V2      EQU    5
85.  0004         V1      EQU    4
86.                ;
87.                ; digit 4
88.  0006         VOLTL   EQU    6
89.  0005         AMPL    EQU    5
90.  0004         V4      EQU    4
91.                ;
92.                ; flag bits
93.                ;
94.  0000         KEYREL  EQU    0         ;KEY NOT RELEASE
95.  0001         CYCL    EQU    1         ;AUTO CYCLE
96.  0002         ERRO    EQU    2         ;ERROR CONDITION
97.  0004         UPDATE  EQU    4         ;UPDATE DISPLAY LED
98.                ;
99.                ;
100.               ;
101. 0777                 ORG    777
102.               ;
103. 0777 5361            GOTO   INIT
104.               ;
105.               ;
106.               ;
107.               ;******* SUBROUTINES ***********
108.               ;
109. 0000                 ORG    0
110.               ;
111. 0000 0153    INI     CLRF   FLAGS     ;ZERO ALL FLAGS BITS
112. 0001 0166            CLRF   METER     ;INIT METER TO DISPLAY SET
113. 0002 0147            CLRF   CONT      ;INIT VCO & CURRENT TO 0
114. 0003 0160            CLRF   CNTR      ;INIT V0 LED ON
115. 0004 6061            MOVLW  061       ;INIT ALL 4 DIGITS
116. 0005 0054            MOVWF  DIG1      ;READY LED ON & INIT TO DISCHARGE
117. 0006 6162            MOVLW  162
118. 0007 0055            MOVWF  DIG2
119. 0010 6164            MOVLW  164
120. 0011 0056            MOVWF  DIG3
121. 0012 6170            MOVLW  170
122. 0013 0057            MOVWF  DIG4
123. 0014 6013            MOVLW  13        ;INIT DIGIT POINTER
124. 0015 0044            MOVWF  DIGPTR
125. 0016 0064            MOVWF  RATE      ;BYPASS SET LED VALUE
126. 0017 5234            GOTO   VOLT      ;INIT SYSTEM TO VOLT READING & CHECK FOR VOLTAGE TOO HIGH
```

```
127.         ;
128.         ;
129.         ; OUTPUT RATE TO DAC
130.         ;
131.         ; range stored value   dac range for output
132.         ;       000                   000
133.         ;       001                   010
134.         ;       010             msb-- 100 --lsb
135.         ;       011                   110
136.         ;       100                   111
137.         ;               (bits 2,3,4 of cont register)
138.         ;
139.         ;
140. 0020 6034  OUTRAT  MOVLW   034         ;LOAD 1 S TO DAC (TEMP)
141. 0021 0447          IORWF   CONT,F
142. 0022 1024          MOVF    RATE,W      ;PICKUP RATE VALUE
143. 0023 0050          MOVWF   TEMP1       ;DROP IT
144. 0024 2003          BCF     3,0         ;CLEAR CARRY FOR ROLL
145. 0025 1550          RLF     TEMP1,F
146. 0026 1550          RLF     TEMP1,F
147. 0027 1550          RLF     TEMP1,F     ;MULTIPLY BY 2 FOR SCALING
148. 0030 1010          MOVF    TEMP1,W
149. 0031 3103          BTFSC   3,2         ;TEST FOR RATE = 0
150. 0032 5037          GOTO    OUT1
151. 0033 3250          BTFSC   TEMP1,5     ;TEST FOR RATE = 4
152. 0034 6034          MOVLW   034
153. 0035 0547          ANDWF   CONT,F      ;OUTPUT RATE TO CONTROL
154. 0036 5234          GOTO    VOLT        ;SET BACK TO VOLT READING THEN RETURN TO CALL
155.         ;
156. 0037 2147  OUT1    BCF     CONT,3      ;RATE = 0 THEN SET CONTROL RATE TO 1
157. 0040 2207          BCF     CONT,4
158.         ;
159. 0041 0150  VDELA   CLRF    TEMP1       ;5 ms DELAY
160. 0042 2350          DECFSZ  TEMP1,F
161. 0043 5042          GOTO    !-1
162. 0044 4000          RETLW   0
163.         ;
164.         ;
165. 0045 2317  VMETER  BCF     DIG4,VOLTL  ;TURN ON VOLT LED INDICATOR
166. 0046 2657          BSF     DIG4,AMPL   ;TURN OFF AMP LED
167. 0047 0507          ANDWF   CONT,W      ;GET DAC RANGE
168. 0050 0060  ALED    MOVWF   CNTR        ;ENTRY FOR AMP MEASURE
169. 0051 5060          GOTO    SETLED
170.         ;
171. 0052 2717  SMETER  BSF     DIG4,VOLTL  ;TURN OFF VOLT & AMP LED
172. 0053 2657          BSF     DIG4,AMPL
173. 0054 6017          MOVLW   17          ;TEST FOR BY PASS SET LED
174. 0055 0624          XORWF   RATE,W
175. 0056 3103          BTFSC   3,2
176. 0057 4000          RETLW   0
177.         ;
178. 0060 6160  SETLED  MOVLW   160         ;TURN OFF V1 TO V3
179. 0061 0456          IORWF   DIG3,F
180. 0062 2617          BSF     DIG4,V4     ;TURN OFF V4
181.         ;
182. 0063 2315          BCF     DIG2,V0     ;V0 ON
183. 0064 6040          MOVLW   040
184. 0065 0220          SUBWF   CNTR,W
185. 0066 3403          BTFSS   3,0         ;TEST FOR RANGE = 0
186. 0067 4000          RETLW   0
187. 0070 2216          BCF     DIG3,V1     ;V1 ON
188. 0071 6140          MOVLW   140
189. 0072 0220          SUBWF   CNTR,W
190. 0073 3403          BTFSS   3,0         ;TEST FOR RANGE 1 & 2
191. 0074 4000          RETLW   0
192. 0075 2256          BCF     DIG3,V2     ;V2 ON
193. 0076 6240          MOVLW   240
```

```
194.  0077  0220          SUBWF  CNTR,W
195.  0100  3403          BTFSS  3,0                ;TEST FOR RANGE 3 & 4
196.  0101  4000          RETLW  0
197.  0102  2316          BCF    DIG3,V3            ;V3 ON
198.  0103  6340          MOVLW  340
199.  0104  0220          SUBWF  CNTR,W
200.  0105  3003          BTFSC  3,0                ;TEST FOR RANGE 7
201.  0106  2217          BCF    DIG4,V4            ;V4 ON
202.  0107  4000          RETLW  0
203.                      ;
204.                      ;
205.  0110  2257  AMETER  BCF    DIG4,AMPL          ;AMP LED ON
206.  0111  2717          BSF    DIG4,VOLTL         ;TURN OFF VOLT LED
207.  0112  0507          ANDWF  CONT,W             ;PREPAIRE FOR TEST RANGE 0
208.  0113  3754          BTFSS  DIG1,7             ;TEST FOR CHARGE/DISCHARGE
209.  0114  5150          GOTO   DISCH              ;GOTO DISCHARGE
210.                      ;
211.  0115  3103  CHAR    BTFSC  3,2                ;TEST FOR RANGE = 0
212.  0116  5144          GOTO   V4ON
213.  0117  7500          XORLW  100                ;TEST FOR RANGE = 2
214.  0120  3103          BTFSC  3,2
215.  0121  5146          GOTO   V0ON
216.                      ;
217.  0122  6070          MOVLW  70                 ;NOW RANGE = 1
218.  0123  0210          SUBWF  TEMP1,W
219.  0124  3403          BTFSS  3,0
220.  0125  5144          GOTO   V4ON
221.  0126  6135          MOVLW  135
222.  0127  0210          SUBWF  TEMP1,W
223.  0130  3403          BTFSS  3,0
224.  0131  5142          GOTO   V3ON
225.  0132  6220          MOVLW  220
226.  0133  0210          SUBWF  TEMP1,W
227.  0134  3403          BTFSS  3,0
228.  0135  5140          GOTO   V2ON
229.                      ;
230.  0136  6040  V1ON    MOVLW  40
231.  0137  5050          GOTO   ALED
232.  0140  6140  V2ON    MOVLW  140
233.  0141  5050          GOTO   ALED
234.  0142  6240  V3ON    MOVLW  240
235.  0143  5050          GOTO   ALED
236.  0144  6340  V4ON    MOVLW  340
237.  0145  5050          GOTO   ALED
238.  0146  6000  V0ON    MOVLW  0
239.  0147  5050          GOTO   ALED
240.                      ;
241.  0150  7500  DISCH   XORLW  100                ;TEST FOR RANGE = 2
242.  0151  3503          BTFSS  3,2
243.  0152  5164          GOTO   R3
244.                      ;
245.  0153  6140  R2      MOVLW  140
246.  0154  0210          SUBWF  TEMP1,W
247.  0155  3403          BTFSS  3,0
248.  0156  5146          GOTO   V0ON
249.  0157  6230          MOVLW  230
250.  0160  0210          SUBWF  TEMP1,W
251.  0161  3403          BTFSS  3,0
252.  0162  5136          GOTO   V1ON
253.  0163  5140          GOTO   V2ON
254.                      ;
255.  0164  6065  R3      MOVLW  65                 ;RANGE = 3
256.  0165  0210          SUBWF  TEMP1,W
257.  0166  3403          BTFSS  3,0
258.  0167  5140          GOTO   V2ON
259.  0170  5142          GOTO   V3ON               ;**** NOT CHECH FOR V4 YET ****
260.                      ;
```

```
261.            ;
262.            ;
263.  0171 1023 DACCH  MOVF   TEMP3,W
264.  0172 0622        XORWF  TEMP2,W
265.  0173 3103        BTFSC  3,2
266.  0174 4000        RETLW  0
267.  0175 1022        MOVF   TEMP2,W
268.  0176 0063        MOVWF  TEMP3          ;UPDATE RANGE VALUE
269.  0177 6004        MOVLW  4
270.  0200 0074        MOVWF  TEST
271.  0201 0171        CLRF   M1
272.  0202 5521        GOTO   WAIT
273.            ;
274.            ;
275.            ;
276.            ; CHECK FOR SET KEY OR METER KEY ACTION
277.            ;
278.  0203 6021 CHECK  MOVLW  SET
279.  0204 0611        XORWF  KEY,W
280.  0205 3103        BTFSC  3,2
281.  0206 5223        GOTO   STOP
282.            ;
283.  0207 2613        BSF    FLAGS,UPDATE
284.  0210 6050        MOVLW  METR
285.  0211 0611        XORWF  KEY,W
286.  0212 3503        BTFSS  3,2
287.  0213 4000        RETLW  0              ;NO KEY ACTION
288.            ;
289.  0214 2213 SVA    BCF    FLAGS,UPDATE
290.  0215 1266        INCF   METER          ;METER KEY IS ACTIVE
291.  0216 6003        MOVLW  3
292.  0217 0626        XORWF  METER,W
293.  0220 3503        BTFSS  3,2            ;TEST FOR SET / VOLT / AMP MODE
294.  0221 5365        GOTO   TOP            ;VOLT OR AMP MODE
295.  0222 5416        GOTO   S1             ;DISPLAY SET MODE
296.            ;
297.  0223 4400 STOP   CALL   INI            ;SET KEY ACTION
298.  0224 1037        MOVF   RSAVE,W
299.  0225 0064        MOVWF  RATE           ;RELOAD SET RATE
300.  0226 6001        MOVLW  SETJ           ;CHANGE SYSTEM MODE TO SET MODE
301.  0227 0061        MOVWF  MODE
302.  0230 5416        GOTO   S1
303.            ;
304.            ;
305.            ; MEASURE VOLTS & CURRENT
306.            ;
307.            ;
308.  0231 2007 CURENT BCF    CONT,0         ;SET TO CURRENT READING
309.  0232 2447        BSF    CONT,1
310.  0233 5236        GOTO   X2
311.            ;
312.  0234 2407 VOLT   BSF    CONT,0         ;SET TO VOLT READING
313.  0235 2047        BCF    CONT,1
314.            ;
315.  0236 6100 X2     MOVLW  100            ;320 MS DELAY TO STABLIZE VOLT OR CURRENT
316.  0237 0065        MOVWF  VCOCC
317.            ;
318.  0240 4441 X4     CALL   VDELA
319.  0241 4700        CALL   STLED
320.  0242 1365        DECFSZ VCOCC,F
321.  0243 5240        GOTO   X4
322.            ;
323.  0244 2247 X7     BCF    CONT,5         ;SET VCO DAC = 0
324.  0245 2307        BCF    CONT,6
325.  0246 2347        BCF    CONT,7
326.            ;
327.  0247 3405 X3     BTFSS  RETS,0         ; SYNC ON VCO SIG
```

```
328. 0250 5247           GOTO    '-1
329.                 ;
330. 0251 6004           MOVLW   4              ;LOAD FOR 4 VCO CYCLES COUNT
331. 0252 0065           MOVWF   VCOCC
332. 0253 6240           MOVLW   240            ;LOAD PRECOUNT **** WAS 233 ***
333.                 ;
334. 0254 3005           BTFSC   RETS,0
335. 0255 5254           GOTO    '-1
336.                 ;
337. 0256 0041           MOVWF   RTCC
338.                 ;
339. 0257 3405 X5        BTFSS   RETS,0
340. 0260 5257           GOTO    '-1
341.                 ;
342. 0261 3005           BTFSC   RETS,0
343. 0262 5261           GOTO    '-1
344.                 ;
345. 0263 1365           DECFSZ  VCOCC
346. 0264 5257           GOTO    X5
347.                 ;
348.                 ; ready to get count & adjust DAC
349.                 ;
350. 0265 1001           MOVF    RTCC,W         ;GET COUNT
351. 0266 0050           MOVWF   TEMP1          ;DROP IT
352.                 ;
353. 0267 6305           MOVLW   305            ;SAME FOR UPPER LIMIT *** 336 ****
354. 0270 0210           SUBWF   TEMP1,W
355. 0271 3403           BTFSS   3,0
356.                 ;
357. 0272 4340           RETLW   340
358.                 ;
359. 0273 6040 DACUP     MOVLW   040            ;INCREMENT DAC RANGE BY 1
360. 0274 0747           ADDWF   CONT,F
361. 0275 3003           BTFSC   3,0
362. 0276 5773           GOTO    ERROR          ;NOT OK TO INCREMENT
363. 0277 5247           GOTO    X3
364.                 ;
365.                 ;
366. 0300 1244 STLED     INCF    DIGPTR         ;INCREASING DIGIT
367. 0301 3604           BTFSS   DIGPTR,4
368. 0302 5305           GOTO    ST1
369.                 ;
370. 0303 6014           MOVLW   14             ;RELOAD START DIGIT
371. 0304 0044           MOVWF   DIGPTR
372.                 ;
373. 0305 1000 ST1       MOVF    0,W            ;OUTPUT TO DISPLAY
374. 0306 0046           MOVWF   STROB
375. 0307 4000           RETLW   0
376.                 ;
377.                 ;
378.                 ;
379.                 ;***** MAIN ROUTINE **************
380.                 ;
381.                 ;
382.                 ; READ KEYS
383.                 ;
384. 0310 0151 T1        CLRF    KEY            ;CLEAR ANY OLD KEY
385. 0311 6000           MOVLW   0              ;CLEAR ACCUMLR
386. 0312 3505           BTFSS   RETS,2         ;TEST FIRST KEY RETURN
387. 0313 6040           MOVLW   040            ;LOAD KEY 1 CODE
388. 0314 3545           BTFSS   RETS,3         ;SECOND KEY ?
389. 0315 6020           MOVLW   020
390. 0316 0050           MOVWF   TEMP1          ;STORE NEW KEY FOR TEST ONLY
391. 0317 1010           MOVF    TEMP1,W        ;GET ZERO STATUS BIT VALID
392. 0320 3103           BTFSC   3,2            ;TEST: ANY KEY DOWN?
393. 0321 5344           GOTO    NOKEY
394.                 ;
```

```
395.          ; develop key code
396.          ;
397. 0322 6017 KEYDN  MOVLW  017           ;MASK TO PICKUP DIGIT NO.
398. 0323 0500        ANDWF  0,W
399. 0324 0410        IORWF  TEMP1,W       ;SUM W/ DIGIT TO =KEY CODE
400. 0325 0050        MOVWF  TEMP1,F       ;DROP FINISHED KEY CODE
401.          ;
402. 0326 0612        XORWF  KEYQ,W        ;COMPARE TO KEY IN DEBOUNCE
403. 0327 3503        BTFSS  3,2           ;SKIP IF NEW KEY = OLD ONE
404. 0330 5341        GOTO   DEBOU
405.          ;
406.          ; output key for processing
407.          ;
408. 0331 1010        MOVF   TEMP1,W       ;PICK UP KEY
409. 0332 3013        BTFSC  FLAGS,KEYREL  ;SKIP ON PASS 1 & IF KEY IS RELEASED
410. 0333 5351        GOTO   KEYDUN        ;SKIP OUT;KEY NOT RELEASED
411. 0334 0051        MOVWF  KEY           ;OUTPUT KEY
412. 0335 6004        MOVLW  4             ;LOAD KEY RELEASE COUNT
413. 0336 0052        MOVWF  KEYQ          ;STORE IT
414. 0337 2413        BSF    FLAGS,KEYREL  ;KEY RELEASE FLAG
415. 0340 5351        GOTO   KEYDUN
416.          ;
417. 0341 1010 DEBOU  MOVF   TEMP1,W       ;STORE NEW KEY FOR DEBOUNCE
418. 0342 0052        MOVWF  KEYQ
419. 0343 5351        GOTO   KEYDUN
420.          ;
421.          ;-----------------------
422.          ; key codes
423.          ;
424.          ;      key return : digptr : key name : octal
425.          ;
426.          ;         0001  1100     CHARGE    041    DIGIT 1  KEY1
427.          ;         0010  1100     SET       021             KEY2
428.          ;         0001  1101     DISCRGE   042    DIGIT 2  KEY1
429.          ;         0010  1101     AUTO CY   022             KEY2
430.          ;         0001  1110     SPARE     044    DIGIT 3  KEY1
431.          ;         0010  1110     SPARE     024             KEY2
432.          ;         0001  1111     METR      050    DIGIT 4  KEY1
433.          ;         0010  1111     SPARE     030             KEY2
434.          ;
435.          ;-----------------------
436.          ;
437.          ; system mode jump table
438.          ;
439. 0344 3413 NOKEY  BTFSS  FLAGS,KEYREL  ;IS KEY RELEASE NEEDED?
440. 0345 5351        GOTO   KEYDUN        ;RELEASE NOT NEEDED
441. 0346 1352        DECFSZ KEYQ,F        ;DECREMENT "NO KEY" COUNTER
442. 0347 5351        GOTO   KEYDUN        ;NOT READY TO RELEASE KEY
443. 0350 2013        BCF    FLAGS,KEYREL  ;KEY RELEASED
444.          ;
445. 0351 1021 KEYDUN MOVF   MODE,W        ;PICKUP SYSTEM MODE
446. 0352 0742        ADDWF  2,F           ;ADD TO PROG COUNTR FOR JUMP
447.          ;
448. 0353 5555        GOTO   PRECHM        ;PRECHARGE 0
449. 0354 5411        GOTO   SETM          ;SET MODE   1
450. 0355 5661        GOTO   CRGM          ;CHARGE     2
451. 0356 5577        GOTO   DCRGM         ;DISCRG     3
452. 0357 5523        GOTO   PWONM         ;POWER ON   4
453. 0360 5746        GOTO   FINM          ;FINISH MODE 5
454.          ;
455.          ;
456.          ;
457. 0361 4400 INIT   CALL   INI           ;SYSTEM INITIALIZE
458. 0362 2413        BSF    FLAGS,KEYREL  ;BY PASS FIRST KEY LOOP
459. 0363 6004        MOVLW  PWONJ         ;SET SYSTEM TO POWER ON MODE
460. 0364 0061 KEYOUT MOVWF  MODE
461.          ;
```

```
462. 0365 4700 TOP     CALL  STLED           ;UPDATE DIGIT POINTERS
463.                   ;
464. 0366 3445         BTFSS RETS,1          ;TEST FOR EMERGENCY INPUT
465. 0367 5773         GOTO  ERROR
466. 0370 3213         BTFSC FLAGS,UPDATE    ;TEST FOR UPDATE LED
467. 0371 5310         GOTO  T1
468.                   ;
469. 0372 1026         MOVF  METER,W         ;TEST FOR SET DISPLAY
470. 0373 3103         BTFSC 3,2
471. 0374 4452         CALL  SMETER
472. 0375 7401         XORLW 1               ;TEST FOR VOLT DISPLAY
473. 0376 3503         BTFSS 3,2
474. 0377 5402         GOTO  T4
475. 0400 4634         CALL  VOLT
476. 0401 4445         CALL  VMETER
477.                   ;
478. 0402 6002 T4      MOVLW 2               ;TEST FOR AMP DISPLAY
479. 0403 0626         XORWF METER,W
480. 0404 3503         BTFSS 3,2
481. 0405 5310         GOTO  T1
482. 0406 4631         CALL  CURENT
483. 0407 4510         CALL  AMETER
484. 0410 5310         GOTO  T1
485.                   ;
486.                   ;
487.                   ;system mode actions start here
488.                   ;
489.                   ;****** SET MODE *********
490.                   ;
491. 0411 6021 SETM    MOVLW SET             ;TEST: IS KEY "SET"
492. 0412 0611         XORWF KEY,W
493. 0413 3503         BTFSS 3,2             ;SKIP IF KEY = "SET"
494. 0414 5440         GOTO  D1
495.                   ;
496.                   ; "set" key action
497.                   ;
498. 0415 1264         INCF  RATE            ;ADVANCE RATE
499. 0416 0166 S1      CLRF  METER           ;SET TO SET METER
500. 0417 6005         MOVLW 5
501. 0420 0224         SUBWF RATE,W          ;TEST RATE VALUE TOO BIG
502. 0421 3103         BTFSC 3,2             ;SKIP IF RATE =5
503. 0422 0164         CLRF  RATE            ;RESET RATE VALUE
504. 0423 1024         MOVF  RATE,W
505. 0424 0077         MOVWF RSAVE           ;SAVE SET RATE FOR RETREIVE
506. 0425 0060         MOVWF CNTR            ;MOVE RATE TO DISPLAY LED
507. 0426 7400         XORLW 0               ;TEST FOR RATE = 0
508. 0427 3103         BTFSC 3,2
509. 0430 5436         GOTO  RESET
510.                   ;
511. 0431 0360         DECF  CNTR            ;CONVERT RATE TO 40, 140, 240, 340
512. 0432 1660         SWAPF CNTR,F
513. 0433 1560         RLF   CNTR,F
514. 0434 1560         RLF   CNTR,F
515. 0435 2660         BSF   CNTR,5
516. 0436 2213 RESET   BCF   FLAGS,UPDATE
517. 0437 5521         GOTO  WAIT
518.                   ;
519.                   ;
520.                   ;
521. 0440 6050 D1      MOVLW METR            ;TEST FOR METER KEY
522. 0441 0611         XORWF KEY,W
523. 0442 3503         BTFSS 3,2
524. 0443 5450         GOTO  D7
525.                   ;
526. 0444 3026 SV      BTFSC METER,0         ;TEST FOR SET OR VOLT DISPLAY
527. 0445 5416         GOTO  S1              ;DISPLAY SET
528. 0446 1266         INCF  METER
```

```
529.  0447 5436          GOTO    RESET         ;DISPLAY VOLT
530.                ;
531.                ;
532.  0450 6041 D7       MOVLW   CRG           ;TEST "CHARGE" KEY ?
533.  0451 0611          XORWF   KEY,W
534.  0452 3503          BTFSS   3,2
535.  0453 5472          GOTO    D2            ;NOT CRG KEY
536.                ;
537.                ; "charge" key action
538.                ;
539.  0454 2714 D5       BSF     DIG1,RDYL     ;TURN OFF "RDY" LED
540.  0455 2214          BCF     DIG1,CRGL     ;TURN ON CRG LED
541.  0456 2615          BSF     DIG2,DCRGL    ;TURN OFF DISCHARGE LED
542.                ;
543.  0457 2754          BSF     DIG1,7        ;SETUP CHARGE MODE
544.  0460 2755          BSF     DIG2,7
545.  0461 2756          BSF     DIG3,7
546.  0462 2757          BSF     DIG4,7
547.                ;
548.  0463 6001          MOVLW   1
549.  0464 0064          MOVWF   RATE          ;LOAD DEFAULT RATE FOR PRE-CHARGE
550.  0465 4420          CALL    OUTRAT
551.  0466 0161          CLRF    MODE          ;SET SYSTEM MODE TO PRECHARGE = 0
552.  0467 6025 D4       MOVLW   025           ;1 MINUTE DELAY FOR LOW BATTERY & START DISCHAR & CHAR
553.  0470 0076          MOVWF   TEMP4
554.  0471 5436          GOTO    RESET
555.                ;
556.  0472 6042 D2       MOVLW   DCRG          ;TEST DISCHARGE KEY ?
557.  0473 0611          XORWF   KEY,W
558.  0474 3503          BTFSS   3,2
559.  0475 5506          GOTO    D3            ;NOT DCRG KEY
560.                ;
561.                ; "DISCHARGE" key action
562.                ;
563.  0476 2714 AUDS     BSF     DIG1,RDYL     ;TURN OFF "RDY" LED
564.  0477 2215          BCF     DIG2,DCRGL    ;TURN ON DISC LED
565.                ;
566.                ; TEST FOR VO DAC RATE & OUTPUT RATE TO CURRENT DAC
567.                ; DISCHARGE WAS SET UP BY INI RTN
568.                ;
569.  0500 4420          CALL    OUTRAT
570.                ;
571.  0501 6004          MOVLW   4             ;INITIALIZE FOR 3 DATA POINTS & RE-ENTRY POINT FOR DC
572.  0502 0074          MOVWF   TEST
573.  0503 6003          MOVLW   DCRGJ         ;SET DISCHARG MODE
574.  0504 0061          MOVWF   MODE          ;UPDATE MODE
575.  0505 5467          GOTO    D4
576.                ;
577.                ;
578.  0506 2613 D3       BSF     FLAGS,UPDATE  ;BY PASS UPDATE LED
579.  0507 6022          MOVLW   AUTO          ;TEST "AUTO CYCLE" KEY
580.  0510 0611          XORWF   KEY,W
581.  0511 3503          BTFSS   3,2
582.  0512 5516          GOTO    NOACT         ;NOT KEY ACTION
583.                ;
584.                ; 'AUTO CYCLE' key action
585.                ;
586.  0513 2255          BCF     DIG2,AUTOL    ;TURN ON AUTO LED
587.  0514 2453          BSF     FLAGS,CYCL    ;SET AUTO BIT
588.  0515 5476          GOTO    AUDS          ;GOTO AUTO DISCHARGE
589.                ;
590.                ; no keys down
591.                ;
592.  0516 1367 NOACT    DECFSZ  DELT1,F       ;ONE SEC. DELAY
593.  0517 5521          GOTO    WAIT
594.  0520 5436          GOTO    RESET
595.                ;
```

```
596.                    ;
597.  0521  4441  WAIT   CALL    VDELA           ;4 ms DELAY
598.  0522  5365         GOTO    TOP
599.                     ;
600.                     ;
601.                     ;****** POWER-ON MODE *********
602.                     ;
603.  0523  6021  PWONM  MOVLW   SET             ;TEST FOR 'SET KEY
604.  0524  0611         XORWF   KEY,W
605.  0525  3503         BTFSS   3,2             ;SKIP IF NOT SET KEY
606.  0526  5534         GOTO    P1
607.                     ;
608.                     ;   SET key action
609.                     ;
610.  0527  6001  P2     MOVLW   SETJ            ;SETUP SET MODE
611.  0530  0061         MOVWF   MODE
612.  0531  0164         CLRF    RATE            ; V LED INITIALIZE
613.  0532  0177         CLRF    RSAVE
614.  0533  5416         GOTO    S1              ;DISPLAY VO LED THEN GOTO TOP
615.                     ;
616.  0534  6050  P1     MOVLW   METR            ;TEST FOR METER KEY ACTION
617.  0535  0611         XORWF   KEY,W
618.  0536  3503         BTFSS   3,2
619.  0537  5545         GOTO    P3
620.  0540  3426         BTFSS   METER,0
621.  0541  5444         GOTO    SV              ;GOTO DISPLAY VOLT
622.  0542  0166         CLRF    METER           ;DISPLAY SET RATE
623.  0543  2715         BSF     DIG2,V0
624.  0544  5436         GOTO    RESET
625.                     ;
626.  0545  2613  P3     BSF     FLAGS,UPDATE
627.  0546  1365         DECFSZ  VCOCC,F
628.  0547  5521         GOTO    WAIT
629.                     ;
630.  0550  4634         CALL    VOLT            ;TEST: BATERY CONNECTED?
631.  0551  0507         ANDWF   CONT,W          ;TEST FOR RANGE = 0
632.  0552  3503         BTFSS   3,2             ;SKIP IF RANGE = 0
633.  0553  5527         GOTO    P2              ;YES BATTERY IS CONNECTED
634.  0554  5521         GOTO    WAIT
635.                     ;
636.                     ;
637.                     ;
638.                     ; ***** PRE-CHARGR MODE **********
639.                     ;
640.  0555  4603  PRECHM CALL    CHECK           ;TEST FOR SET OR METER KEY ACTION
641.  0556  4634         CALL    VOLT
642.  0557  0507         ANDWF   CONT,W          ;TEST FOR VCO RANGE = 0
643.  0560  3503         BTFSS   3,2
644.  0561  5567         GOTO    ADJRAT          ;RANGE <> 0, ADJUST RATE
645.                     ;
646.  0562  1367  PRC2   DECFSZ  DELT1,F
647.  0563  5521         GOTO    WAIT            ;MAY BE A LOW BATTERY
648.  0564  1376         DECFSZ  TEMP4,F
649.  0565  5562         GOTO    PRC2
650.  0566  5773         GOTO    ERROR           ;TIME OUT *** SHORT OR DEAD BATTERY ***
651.                     ;
652.  0567  1037  ADJRAT MOVF    RSAVE,W
653.  0570  0064         MOVWF   RATE            ;RELOAD SET RATE
654.  0571  4420         CALL    OUTRAT
655.                     ;
656.  0572  0171  PRC1   CLRF    M1
657.  0573  6002         MOVLW   CRGJ            ;SET FOR NORMAL CHARGE MODE
658.  0574  0061         MOVWF   MODE            ;UPDATE SYSTEM MODE
659.  0575  2213         BCF     FLAGS,UPDATE
660.  0576  5722         GOTO    CR4
661.                     ;
662.                     ;
```

```
663.            ; ******** DISCHARGE MODE *********
664.            ;
665. 0577 4603 DCRGM  CALL  CHECK        ;TEST FOR SET OR METER KEY ACTION
666.            ;
667. 0600 1367 DC1    DECFSZ DELT1,F
668. 0601 5521        GOTO  WAIT         ;EXIT THIS MEASURMT CYCLE
669.            ;
670. 0602 4634        CALL  VOLT         ;TEST FOR VCO DAC = 0
671. 0603 0507        ANDWF CONT,W
672. 0604 7103        BTFSC 3,2          ;TEST FOR DAC = 0
673. 0605 5654        GOTO  DC5
674. 0606 0062        MOVWF TEMP2        ;SAVE DAC FOR CHECK DAC CHANGE
675.            ;
676. 0607 1376        DECFSZ TEMP4,F
677. 0610 5600        GOTO  DC1
678.            ;
679. 0611 2213        BCF   FLAGS,UPDATE
680.            ;
681. 0612 6005        MOVLW 005          ;10 SEC DELAY TIME
682. 0613 0076        MOVWF TEMP4
683.            ;
684.            ;   discharge tests
685.            ;
686.            ; three measurements are made and stored in
687.            ; m3,m2,m1 with m1 being the most current.
688.            ; m2-m1 = delta1
689.            ; m3-m2 = delta2
690.            ; if del2 >= del1 :(concave up) continue discharge
691.            ; if del2 <= del1 and del1 > threshold : end discharge
692.            ; if m1 > m3 goto error as voltage is increasing
693.            ;
694. 0614 1032        MOVF  M2,W         ;SHIFT OLD DATA
695. 0615 0073        MOVWF M3
696. 0616 1031        MOVF  M1,W
697. 0617 0072        MOVWF M2
698.            ;
699. 0620 1010        MOVF  TEMP1,W      ;PICK UP NEW READING
700. 0621 0071        MOVWF M1
701.            ;
702. 0622 4571        CALL  DACCH        ;CHECK FOR DAC RANGE CHANGED
703.            ;
704. 0623 1374        DECFSZ TEST,F      ;COUNT MEASUREMENTS
705. 0624 5365        GOTO  TOP
706.            ;
707.            ; compute
708.            ;
709. 0625 6001        MOVLW 1            ;SET UP FOR NEXT 1 MEASUREMENTS
710. 0626 0074        MOVWF TEST
711.            ;
712. 0627 1031        MOVF  M1,W
713. 0630 0232        SUBWF M2,W
714. 0631 3403        BTFSS 3,0          ;SKIP IF DELT1 <0
715. 0632 5521        GOTO  WAIT
716.            ;
717. 0633 0067        MOVWF DELT1
718. 0634 1032        MOVF  M2,W
719. 0635 0233        SUBWF M3,W
720. 0636 3403        BTFSS 3,0          ;SKIP IF DELT2 <0
721. 0637 5521        GOTO  WAIT
722.            ;
723. 0640 0070        MOVWF DELT2
724. 0641 0267        SUBWF DELT1,F
725. 0642 3403        BTFSS 3,0
726. 0643 5365        GOTO  TOP          ;CONCAVE UP
727.            ;
728.            ; CONCAVE DOWN . CHECK FOR FINISH
729.            ;
730. 0644 1031        MOVF  M1,W
```

```
731.  0645  0273         SUBWF   M3,F
732.  0646  6007         MOVLW   007
733.  0647  0233         SUBWF   M3,W
734.  0650  3403         BTFSS   3,0
735.  0651  5365         GOTO    TOP              ;GOING DOWN BUT < THRESHOLD
736.  0652  3453         BTFSS   FLAGS,CYCL       ;TEST FOR AUTO
737.  0653  5743         GOTO    FINISH           ;FINISH DISCHARGE
738.                ;
739.  0654  3453  DC5    BTFSS   FLAGS,CYCL       ;TEST 'AUTO' SELECTED
740.  0655  5773         GOTO    ERROR            ;BATTERY IS DISCHARGED TOO LOW
741.                ;
742.  0656  1037         MOVF    RSAVE,W
743.  0657  0064         MOVWF   RATE             ;RELOAD SET RATE
744.  0660  5454         GOTO    D5               ;GOTO CHARGE KEY ACTION
745.                ;
746.                ;
747.                ;
748.                ; ******** CHARGE MODE *********
749.                ;
750.  0661  4603  CRGM   CALL    CHECK            ;TEST FOR SET OR METER KEY ACTION
751.                ;
752.  0662  1367  CR2    DECFSZ  DELT1,F          ;SAMPLE TIMER COUNTDOWN
753.  0663  5521         GOTO    WAIT
754.                ;
755.  0664  4634         CALL    VOLT             ;TEST FOR SHORT & OPEN BATTERY
756.  0665  0507         ANDWF   CONT,W
757.  0666  0062         MOVWF   TEMP2            ;SAVE VCO DAC FOR CHECK DAC CHANGE
758.  0667  3103         BTFSC   3,2              ;TEST FOR SHORT OR DAC = 0
759.  0670  5773         GOTO    ERROR
760.  0671  7740         XORLW   340              ;TEST FOR DAC = 7
761.  0672  3503         BTFSS   3,2
762.  0673  5700         GOTO    CR3
763.  0674  6330         MOVLW   330              ;TEST FOR UPPER LIMIT
764.  0675  0210         SUBWF   TEMP1,W
765.  0676  3003         BTFSC   3,0
766.  0677  5773         GOTO    ERROR            ;OPEN BATTERY
767.                ;
768.  0700  1376  CR3    DECFSZ  TEMP4,F
769.  0701  5662         GOTO    CR2
770.                ;
771.  0702  2213         BCF     FLAGS,UPDATE
772.                ;
773.  0703  6015         MOVLW   015              ;20 SEC DELAY TIME
774.  0704  0076         MOVWF   TEMP4
775.                ;
776.                ;   charge tests
777.                ;
778.                ; get new voltage value each pass. if new value
779.                ; is => old maximum value, replace old max with new max.
780.                ; if new value is < old max, compare: (max - new) - threshold.
781.                ; exit charge mode if down trend is greater than threshold.
782.                ;
783.                ;
784.  0705  4571         CALL    DACCH            ;CHECK FOR DAC CHANGED
785.                ;
786.  0706  1010         MOVF    TEMP1,W          ;PICK UP NEW VOLT VALUE
787.  0707  0231         SUBWF   M1,W             ;COMPARE W/ OLD MAX VALUE
788.  0710  3003         BTFSC   3,0              ;SKIP IF NEW < OLD, UP TREND
789.  0711  5715         GOTO    DOWN
790.                ;
791.                ; upward volt trend
792.                ;
793.  0712  1010  CR6    MOVF    TEMP1,W          ;PICK UP 'NEW' AGAIN
794.  0713  0071         MOVWF   M1               ;STORE NEW MAX VALUE
795.  0714  5722         GOTO    CR4              ;EXIT THIS PASS
796.                ;
797.                ; downward volt trend
798.                ;
```

```
799. 0715 0072 DOWN   MOVWF  M2         ;M2 CONTAIN THE DIFFERENT OF M1 & TEMP1
800. 0716 6010        MOVLW  10         ;LOAD THRESHOLD
801. 0717 0232        SUBWF  M2,W       ;COMPARE W/THRESHOLD
802. 0720 3003        BTFSC  3,0        ;SKIP IF < THRES
803. 0721 5743        GOTO   FINISH
804.                  ;
805. 0722 4631 CR4    CALL   CLRENT
806. 0723 0507        ANDWF  CONT,W     ;TEST FOR VCO DAC = 0
807. 0724 3503        BTFSS  3,2
808. 0725 5365        GOTO   TOP
809.                  ;
810. 0726 6200        MOVLW  200
811. 0727 0210        SUBWF  TEMP1,W
812. 0730 3003        BTFSC  3,0
813. 0731 5365        GOTO   TOP
814.                  ;
815. 0732 6034        MOVLW  034        ;GET CURRENT DAC
816. 0733 0507        ANDWF  CONT,W
817. 0734 7404        XORLW  004        ;TEST FOR CURRENT DAC = 1
818. 0735 3103        BTFSC  3,2
819. 0736 5773        GOTO   ERROR      ;MINIMUM CURRENT DAC STILL TOO HIGH
820. 0737 6004        MOVLW  004
821. 0740 0247        SUBWF  CONT,F     ;DECREASING CURRENT DAC BY 1
822. 0741 0171        CLRF   M1         ;START NEW MEASURE AGAIN
823. 0742 5722        GOTO   CR4
824.                  ;
825. 0743 4400 FINISH CALL   IN1        ;FINISH CHARGE / DISCHARGE
826. 0744 6005 ERRM   MOVLW  FINJ       ;LOAD FINISH MODE / ERROR MODE ENTRY
827. 0745 5364        GOTO   KEYOUT
828.                  ;
829.                  ;
830.                  ;
831. 0746 6021 FINM   MOVLW  SET        ;TEST FOR SET KEY ACTION
832. 0747 0611        XORWF  KEY,W
833. 0750 3103        BTFSC  3,2
834. 0751 5361        GOTO   INIT       ;SET KEY ON / REFRESH SYSTEM
835. 0752 1376        DECFSZ TEMP4,F    ;1 SEC DELAY
836. 0753 5521        GOTO   WAIT
837. 0754 6150        MOVLW  150        ;500 ms DELAY
838. 0755 0076        MOVWF  TEMP4
839.                  ;.
840. 0756 3113        BTFSC  FLAGS,ERRO ;TEST FOR ERROR CONDICTION
841. 0757 5767        GOTO   F2         ;YES ERROR
842.                  ;
843. 0760 3714        BTFSS  DIG1,RDYL  ;TEST FOR READY LED IS ON OR OFF
844. 0761 5764        GOTO   F1
845. 0762 2314        BCF    DIG1,RDYL
846. 0763 5365        GOTO   TOP
847. 0764 2714 F1     BSF    DIG1,RDYL
848. 0765 2654        BSF    DIG1,ERRL  ;TURN OFF ERROR LED TOO
849. 0766 5365        GOTO   TOP
850.                  ;
851. 0767 3654 F2     BTFSS  DIG1,ERRL  ;TEST FOR ERROR LED IS ON OR OFF
852. 0770 5764        GOTO   F1         ;GOTO TO TURN OFF ERROR / READY LED
853. 0771 2254        BCF    DIG1,ERRL  ;TURN ON ERROR LED
854. 0772 5365        GOTO   TOP
855.                  ;
856.                  ;
857.                  ; ERROR CASE
858.                  ;
859. 0773 4400 ERROR  CALL   IN1
860. 0774 2513        BSF    FLAGS,ERRO ;SET ERROR CONDICTION
861. 0775 5744        GOTO   ERRM       ;GOTO ERROR MODE CONDICTION
862.                  ;
863.                  ;
864.                         END
```

```
CROSS REFERENCE TABLE
SYMBOL-VALUE  REFERENCES
ADJRAT   0567  -652 644
ALED     0050  -168 231 233 235 237 239
AMETER   0110  -205 483
AMPL     0175  -99 166 172 205
AUDS     0476  -563 586
AUTO     0022  -59 579
AUTOL    0155  -79 586
CHAR     0115  -211
CHECK    0203  -278 640 665 750
CNTR     0020  -37 114 168 184 189 194 199 506 511 512 513 514 515
CONT     0007  -22 113 141 153 156 157 167 207 308 309 312 313 323 324 325 360 631 642 671 756 806 816 821
CR2      0662  -752 769
CR3      0700  -768 762
CR4      0722  -805 660 795 823
CR6      0712  -793
CR6      0041  -56 532
CR6J     0002  -65 657
CR6L     0144  -75 540
CR6M     0661  -750 450
CURENT   0231  -308 482 805
CYCL     0131  -95 587 736 739
D1       0440  -521 494
D2       0472  -556 535
D3       0506  -578 559
D4       0467  -552 575
D5       0454  -539 744
D7       0450  -532 524
DACCH    0171  -263 702 784
DACUP    0273  -359
DC1      0600  -667 677
DC5      0654  -739 673
DCR6     0042  -58 556
DCR6J    0003  -66 573
DCR6L    0154  -80 541 564
DCR6M    0577  -665 451
DEBOU    0341  -417 404
DELT1    0027  -45 592 646 667 717 724 752
DELT2    0030  -46 723
DIG1     0014  -32 116 208 539 540 543 563 843 845 847 848 851 853
DIG2     0015  -33 118 182 541 544 564 586 623
DIG3     0016  -34 120 179 187 192 197 545
DIG4     0017  -35 122 165 166 171 172 180 201 205 206 546
DIGPTR   0004  -26 124 366 367 371
DISCH    0150  -241 209
DOWN     0715  -799 789
ERRL     0145  -74 848 851 853
ERRM     0744  -826 861
ERRO     0132  -96 840 860
ERROR    0773  -859 362 465 650 740 759 766 819
F1       0764  -847 844 852
F2       0767  -851 841
FINISH   0743  -825 737 803
FINJ     0005  -68 826
FINM     0746  -831 453
FLAGS    0013  -30 111 283 289 409 414 439 443 458 466 516 578 587 626 659 679 736 739 771 840 860
IN1      0000  -111 297 457 825 859
INIT     0361  -457 103 834
KEY      0011  -28 279 285 384 411 492 522 533 557 580 604 617 832
KEYDN    0322  -397
KEYDUN   0351  -445 410 415 417 440 442
KEYOUT   0364  -460 527
KEYO     0012  -29 402 413 418 441
KEYREL   0130  -94 409 414 439 443 458
M1       0031  -47 271 656 696 700 712 750 787 794 822
M2       0032  -48 694 697 713 718 799 801
M3       0033  -49 695 719 731 733
```

```
METER   0026  -44 112 290 292 469 479 499 526 528 620 622
METR    0050  -50 294 521 616
MODE    0021  -38 301 445 460 551 574 611 658
NOACT   0516  -592 582
NOKEY   0344  -439 393
OUT1    0037  -156 150
OUTRAT  0020  -140 550 569 654
P1      0534  -616 606
P2      0527  -610 633
P3      0545  -626 619
PRC1    0572  -656
PRC2    0562  -646 649
PRECHJ  0000  -63
PRECHM  0555  -640 448
PWONJ   0004  -67 459
PWONM   0523  -603 452
R2      0153  -245
R3      0164  -255 243
RATE    0024  -42 125 142 174 299 498 501 503 504 549 612 653 743
RDYL    0146  -73 539 563 843 845 847
RESET   0436  -516 509 529 554 594 624
RETS    0005  -21 327 334 339 342 386 388 464
RSAVE   0037  -52 298 505 613 652 742
RTCC    0001  -39 337 350
S1      0416  -499 295 302 527 614
SET     0021  -57 278 491 603 831
SETJ    0001  -64 300 610
SETLED  0060  -178 169
SETM    0411  -491 449
SMETER  0052  -171 471
ST1     0305  -373 368
STLED   0300  -366 319 462
STOP    0223  -297 281
STROB   0006  -20 374
SV      0444  -526 621
SVA     0214  -289
T1      0310  -384 467 481 484
T4      0402  -478 474
TEMP1   0010  -27 143 145 146 147 148 151 159 160 218 222 226 246 250 256 351 354 390 391 399 400 408 417 679 754 786 743 811
TEMP2   0022  -40 264 267 674 757
TEMP3   0023  -41 263 268
TEMP4   0036  -51 553 648 676 682 768 774 835 838
TEST    0034  -50 270 572 704 710
TOP     0365  -462 294 598 705 726 735 808 813 846 849 854
UPDATE  0134  -97 283 289 466 516 578 626 659 679 771
V0      0156  -78 182 623
V0ON    0146  -238 215 248
V1      0164  -85 187
V1ON    0136  -230 252
V2      0165  -84 192
V2ON    0140  -232 228 253 258
V3      0166  -87 197
V3ON    0142  -234 224 239
V4      0174  -90 180 201
V4ON    0144  -236 212 220
VDCC    0025  -43 316 320 331 345 627
VDELA   0041  -159 318 597
VMETER  0045  -165 476
VOLT    0234  -312 126 154 475 630 641 670 755
VOLTL   0176  -88 165 171 206
WAIT    0521  -597 272 517 593 628 634 647 666 715 721 753 836
X2      0236  -315 310
X3      0247  -327 363
X4      0240  -318 321
X5      0257  -339 346
X7      0244  -323
 132 SYMBOLS
```

It is noted that the illustrated embodiment is designed for charging and/or testing of one battery at a time but may be used for simultaneously processing of a number of batteries, using separate series and shunt regulators and using one microprocessor and associated linear circuitry together with multiplexing circuitry for cyclically monitoring all batteries and applying control signals to the series and shunt regulators of such batteries.

It is also noted that in place of the arrangement using a VCO as illustrated, a conventional analog-to-digital converter may be used which may be an "on-board" circuit or the same chips as the microprocessor. In such a modification, it is highly desirable that the ranging amplifier 57 and ladder 58 be retained to obtain high resolution over a wide range without requiring a convertor having correspondingly high resolution.

It will be understood that these and other modifications may be made without departing from the spirit and scope of the novel concepts of this invention.

We claim:

1. Control apparatus for battery current control, comprising: battery terminals, power supply means, charging means coupling said power supply means to said battery terminals for supplying a charging current to a battery coupled to said battery terminals, voltage monitoring means coupled to said battery terminals, microprocessor means coupled to said voltage monitoring means for register of digital data corresponding to the voltage at said battery terminals and coupled to said charging means to apply a control signal thereto, said digital data including present battery voltage data corresponding to the voltage at said battery terminals at the time of register of said data, memory means associated with said microprocessor means for storage of digital data including peak voltage data reflecting the peak voltage reached in a charging operation and threshold data corresponding to a certain drop in voltage from said peak voltage, said microprocessor means being arranged to effect a charging operation in which said charging means is operated to apply a high charging current to said battery terminals and in which monitoring and control operations are periodically effected, each monitoring and control operation including registering of present battery voltage data and a comparison of said peak voltage data and the registered present battery voltage data, update of said peak voltage data when and only when said registered present battery voltage data has a value which is higher than the value of said peak voltage data and application of a control signal to said charge control means to stop application of a high charging current when said present battery voltage data has a value less than the value of said peak voltage data and when at the same time the difference between such values is greater than a threshold value corresponding to said threshold data.

2. In control apparatus as defined in claim 1, said digital voltage data being registered frequently and with a high resolution for precise determination of the magnitude of said present battery voltage and said peak voltage and prompt determination of a drop of said present battery voltage from said peak voltage, the frequency of registration of data and the resolution thereof being such that normal transient variations from one monitoring and control operation to the next subsequent monitoring and control operation produce a change of a certain number of bits in registered data, said threshold data corresponding to a number of bits at least as great as said certain number.

3. Control apparatus for battery current control, comprising: battery terminals, power supply means, charging means coupling said power supply means to said battery terminals for supplying a charging current to a battery coupled to said battery terminals, voltage monitoring means coupled to said battery terminals, microprocessor means coupled to said voltage monitoring means for periodic registering of digital data including present battery voltage data corresponding to the voltage at said battery terminals at the time of register of said data and coupled to said charging means to apply a control signal thereto, memory means associated with said microprocessor means for storage of registered battery voltage data and digital control data, said microprocessor means being responsive to a charge start signal to operate in a pre-charge mode to control said charging means to apply a relatively low charge current to said battery terminals and to then monitor said digital data periodically to compare present and stored battery voltage data and determine the rate of change of battery voltage, said microprocessor means in said pre-charge mode being operative to discontinue application of current to said battery terminals when the voltage at said terminals fails to increase at least a certain rate and to otherwise initiate operation in a fast charge mode, said microprocessor means in said fast charge mode being operable to control said charging means to apply a high charge current to said battery terminals and to monitor said digital data and stop application of said high charging current when a full charge condition is reached.

4. Control apparatus for battery current control, comprising: battery terminals, power supply means, charging means coupling said power supply means to said battery terminals for supplying a charging current to a battery coupled to said battery terminals, discharging means coupled to said battery terminals for discharging a battery coupled thereto, voltage monitoring means coupled to said battery terminals, microprocessor means coupled to said voltage monitoring means for periodic registering of digital data including present battery voltage data corresponding to the voltage at said battery terminals at the time of register of said data and coupled to said charging means and said discharging means to apply control signals thereto, memory means associated with said microprocessor means for storage of registered battery voltage data and digital control data, said microprocessor means being responsive to a charge start signal to effect a charging operation with control signals being applied to said charging means while monitoring said digital data to apply charging current to said battery terminals until a full charge condition is reached, and said microprocessor means being responsive to a discharge start signal to effect a discharging operation with control signals being applied to said discharge means to draw current from said terminals until a predetermined discharge condition is reached, said microprocessor means during said discharging operation being operative to periodically effect monitoring and control operations each including arithmetic operations on digital data to terminate discharge when said predetermined discharge condition is detected and to otherwise store data for analysis in subsequent monitoring and control operations, said digital data having values including a first value corresponding to the said registered present voltage data and a second value corresponding to battery voltage data stored in a preceding monitoring and control operation, and said arithmetic operations including a determination of a first delta value equal to said second value minus said first value with said discharging operation being continued when said first delta value is less than a certain threshold value.

5. In control apparatus as defined in claim 4, said digital data values further including a third value corresponding to the battery voltage data which was registered and stored during the monitoring and control operation which preceded the preceding monitoring and control operation and wherein said arithmetic operations include a determination of a second delta value equal to said third value minus said second value with said discharging operation being continued when either said second delta value is greater than said first delta value or said first delta value is less than said threshold value.

6. In control apparatus as defined in claim 4, keyboard means for selectively applying an autocycle control signal, said microprocessor means being operable in response to said autocycle control signal to store digital autocycle control data in said memory means and to operate in an autocycle mode to initiate a discharging operation and to develop said charge start signal to initiate said charging operation after initiation of a discharging operation and in response to reaching said predetermined discharge condition.

7. Control apparatus for battery current control, comprising: battery terminals, power supply means, charging means coupling said power supply means to said battery terminals for supplying a charging current to a battery coupled to said battery terminals, resistance means coupled in series between said charging means and said battery terminals, voltage monitoring means coupled to said battery terminals and said resistance means and selectively operable in a first mode to monitor the voltage between said battery terminals and in a second mode to monitor the voltage across said resistance means, microprocessor means coupled to said voltage monitoring means for operation thereof in said first mode and register of digital voltage data corresponding to the voltage at said battery terminals and for operation in said second mode and register of digital current data corresponding to the voltage across said resistance means, said microprocessor means being coupled to said charging means to apply control signals thereto, memory means associated with said microprocessor means for storage and supply of digital control data including a charge current value and charge termination control data, said microprocessor means being operable in response to said digital current data and charge current value to control said charging means and to apply a certain substantially constant charge current to said battery terminals and being operable in response to said digital voltage data to terminate application of said constant charge current when a full charge condition is reached.

8. In control apparatus as defined in claim 7, manual input means for input of selectable control data and storage thereof by said memory means, said selectable control data including said charge current value.

9. Control apparatus comprising: input circuit means for supplying a control voltage, output circuit means, and control circuit means for controlling said output circuit means as a function of the magnitude of said control voltage, said control circuit means comprising voltage controlled oscillator means coupled to said input circuit means to develop a cyclic output signal having a period which is a function of said control voltage magnitude, microprocessor means having input and output ports and having oscillator means and real time counter means associated therewith, said oscillator means being operative to supply fixed clock signals for operation of said microprocessor means and said counter means, means coupling said output circuit means to said output ports, and means coupling said voltage controlled oscillator means to one of said input ports to apply said cyclic output signal thereto, said microprocessor means including means for responding to said cyclic output signal and to register data corresponding to the number of counts registered by said real time counter means during a predetermined integer number of cycles of said voltage controlled oscillator output signal, and means for controlling signals applied to said output ports in accordance with said registered data.

10. Apparatus as defined in claim 9 wherein said predetermined integer number is so related to the count capacity of said real time counter means, the frequency of clock pulses applied to said real time counter means and the range of duration of cycles of said voltage controlled oscillator means as to obtain a range of duration of said predetermined integer number of cycles which corresponds to the time required to produce a full count of said real time counter means, to maximize the resolution of measurement of said control voltage.

11. Apparatus as defined in claim 10 wherein said microprocessor means includes count offset means for obtaining a count offset such that the range of said registered data has a minimum value greater than but close to a zero value when the voltage controlled oscillator cycle duration is at a minimum and has a maximum value less than but close to the count capacity of said real time counter means when said voltage controlled oscillator cycle duration is at a maximum.

12. Apparatus as defined in claim 11 wherein said count offset means operates at the beginning of a measurement cycle for pre-loading said real time counter means with a predetermined count such as to obtain said count offset.

13. Apparatus as defined in claim 9 wherein said control circuit means further includes voltage offset means for supplying an offset voltage, and comparator means coupled to said input circuit means, said offset voltage means and said voltage controlled oscillator means, said comparator means being arranged for applying to said voltage controlled oscillator means a voltage which is proportional to the difference between said offset voltage and a voltage proportional to said control voltage.

14. Apparatus as defined in claim 13 wherein said voltage offset means is controllable by said microprocessor to control the value of said offset voltage in steps and to thereby divide the total range of measured control voltage magnitude into a plurality of adjoining ranges.

15. Apparatus as defined in claim 14 wherein said voltage offset means comprises a resistance ladder network.

16. Apparatus as defined in claim 14 wherein said microprocessor means includes means operable at each value of offset voltage to determine whether the measured voltage is within the corresponding current range and to charge the offset voltage to a different value when outside the current range.

* * * * *

UNITED STATES PATENT AND TRADEMARK OFFICE
CERTIFICATE OF CORRECTION

PATENT NO. : 4,746,854

DATED : May 24, 1988

INVENTOR(S) : WILLIAM BAKER, JAMES C. STEVENS, AND PHONG B. CHAU

It is certified that error appears in the above-identified patent and that said Letters Patent is hereby corrected as shown below:

Cover page, under "Other Publications", third line, after 2-1, insert -- to --.
Column 1, line 7, after "battery", insert -- charging --.
Column 4, line 42, after "performances", insert -- of --.
Column 5, line 47, after "count", delete "of" and insert -- or --.

Column 6, line 35, delete "Reference generally designates a charger".
Column 6, line 36, after "numeral", insert -- 10 generally designates a charger --.
Column 6, line 44, after "terminals, insert -- 17 --.
Column 7, last line, after "is", delete "a" and insert -- aborted --.

Column 8, line 1, delete "sorted".
Column 14, line 6, after the period (.), delete "v,10/999".
Column 44, line 24, (claim 3) after "at", insert -- at --.
Column 44, line 44, (claim 4), "appIy" should be -- apply -

Signed and Sealed this

Second Day of May, 1989

*Attest:*

DONALD J. QUIGG

*Attesting Officer*   Commissioner of Patents and Trademarks